United States Patent
Kitano et al.

(10) Patent No.: US 7,119,550 B2
(45) Date of Patent: Oct. 10, 2006

(54) CAPACITANCE DIFFERENCE DETECTING CIRCUIT AND MEMS SENSOR

(75) Inventors: Mayo Kitano, Kasugai (JP); Hideki Sumi, Kasugai (JP); Tsuyoshi Moribe, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/942,127

(22) Filed: Sep. 16, 2004

(65) Prior Publication Data

US 2005/0253596 A1 Nov. 17, 2005

(30) Foreign Application Priority Data

May 14, 2004 (JP) .............................. 2004-144906

(51) Int. Cl.
*G01R 27/26* (2006.01)
*G01P 9/04* (2006.01)

(52) U.S. Cl. .................... 324/658; 324/686; 73/504.12; 73/504.14; 73/514.32

(58) Field of Classification Search ................ 324/658, 324/686; 73/504.12, 504.13, 504.14, 504.15, 73/504.16, 514.01, 514.02, 514.29, 514.32, 73/488–551
See application file for complete search history.

(56) References Cited

U.S. PATENT DOCUMENTS

| | | | |
|---|---|---|---|
| 3,774,089 A | | 11/1973 | Lewis |
| 4,310,806 A | | 1/1982 | Ogasawara |
| 4,439,725 A | * | 3/1984 | Ogasawara .................. 324/662 |
| 4,549,436 A | * | 10/1985 | Barkhoudarian ......... 73/514.02 |
| 4,719,538 A | * | 1/1988 | Cox ......................... 361/283.2 |
| 5,375,469 A | * | 12/1994 | Levy et al. .............. 73/514.23 |
| 5,519,329 A | * | 5/1996 | Satterwhite ................. 324/690 |
| 5,726,579 A | * | 3/1998 | Masuda ....................... 324/679 |
| 5,736,640 A | * | 4/1998 | Farine et al. ............. 73/504.12 |
| 6,282,956 B1 | * | 9/2001 | Okada ...................... 73/504.12 |
| 6,716,253 B1 | * | 4/2004 | Okada ...................... 73/862.43 |
| 6,718,823 B1 | * | 4/2004 | Platt ......................... 73/504.12 |
| 6,722,200 B1 | * | 4/2004 | Roukes et al. ................ 73/580 |
| 6,828,801 B1 | * | 12/2004 | Burdick et al. ............. 324/658 |
| 6,885,200 B1 | * | 4/2005 | Yamagishi et al. ......... 324/663 |
| 6,928,876 B1 | * | 8/2005 | Campbell ................ 73/514.32 |

FOREIGN PATENT DOCUMENTS

| | | |
|---|---|---|
| EP | 0 585 862 | 3/1994 |
| JP | 8-278336 | 10/1996 |
| JP | 10038913 | 2/1998 |
| JP | 2003177021 | 6/2003 |
| RU | 2 148 831 | 5/2000 |

* cited by examiner

*Primary Examiner*—Diane Lee
*Assistant Examiner*—Marina Kramskaya
(74) *Attorney, Agent, or Firm*—Arent Fox PLLC

(57) ABSTRACT

Oscillators have capacitors, respectively, whose capacitances change according to an external force and generate first oscillating signals according to the capacitances. Each of the capacitors is disposed, for example, between a substrate and a mass body that is movably disposed to face the substrate and oscillates in a direction perpendicular to the substrate. A detecting unit detects a relative difference between the capacitances of the capacitors as a difference between frequencies of the first oscillating signals. An angular speed or acceleration applied in a horizontal direction of the substrate is calculated according to the frequency change detected by the detecting unit. Therefore, a capacitance difference detecting circuit and a MEMS sensor that detect a minute change in the capacitances of the two capacitors caused by the external force are formed.

20 Claims, 13 Drawing Sheets

CAPACITANCE DIFFERENCE DETECTING CIRCUIT AND MEMS SENSOR

CROSS REFERENCE TO RELATED APPLICATION

This application is based upon and claims the benefit of priority from Japanese Patent Application No. 2004-144906, filed on May 14, 2004, the entire contents of which are incorporated herein by reference.

BACKGROUND OF THE INVENTION

1. Field of the Invention

The present invention relates to a capacitance difference detecting circuit that detects a change in capacitances of two capacitors and a MEMS sensor that detects an applied angular speed or acceleration according to the change in the capacitances of the two capacitors.

2. Description of the Related Art

In recent years, MEMS sensors (an angular speed sensor and an acceleration sensor) formed by MEMS (Micro Electro Mechanical Systems) are in practical use. The MEMS sensors of this type have a substrate, a mass body disposed displaceably relative to the substrate and oscillating in a vertical direction of the substrate, and two capacitors formed between the substrate and the mass body. They detect, as a change in capacitances (difference between capacitances) of the two capacitors, the displacement of the mass body relative to the substrate caused by a coriolis force (corresponding to an applied angular speed or acceleration) applied in a direction perpendicular to an oscillation direction.

A MEMS sensor of this type detects the change in capacitance caused by the coriolis force as, for example, a difference in delay time that changes according to the capacitance (charge/discharge to the capacitors). Specifically, two nodes to which the two capacitors are connected are supplied with pulse signals respectively. The delay times of the pulse signals differ depending on the capacitance difference. Next, a pulse signal with a pulse width corresponding to the difference between the delay times thereof is generated, and a voltage of this pulse signal is smoothed. Then, the MEMS sensor detects the change in DC voltage resulting from the smoothing as an angular speed or acceleration.

Further, Japanese Unexamined Patent Application Publication No. Hei 8-278336, for example, has disclosed technique for forming a resonance circuit with use of a capacitor and detecting as the change in capacitance a phase difference between an oscillating signal outputted from the resonance circuit and a reference oscillating signal outputted from a reference oscillator.

Each element of the MEMS sensor can be made very small because it is formed by the use of semiconductor manufacturing technology. However, the capacitance of a capacitor as a constituent of the MEMS sensor is also small, so that an amount of change in the capacitance caused by the coriolis force is small. This results in lowered detection sensitivity. With an extremely small amount of change in capacitance, only a small change is caused in delay time, and thus the DC voltage hardly changes. This may cause a failure in detection of a small angular speed and acceleration. Specifically, the capacitance of a capacitor used in the MEMS sensor is as small as several pF, and the change in capacitance of one capacitor caused by the coriolis force is several tens fF. Accordingly, a difference between capacitances of two capacitors that change according to the angular speed and acceleration is several aF to several tens aF. In other words, a highly sensitive MEMS sensor which can detect the capacitance difference of several aF is required.

Moreover, in the aforementioned technique disclosed in Japanese Unexamined Patent Application Publication No. Hei 8-278336, there is only one resonance circuit whose capacitance changes by an external force. Therefore, it is not possible to form a capacitance difference detecting circuit that detects a difference between capacitances of two capacitors that change by an external force. Nor is it possible to form a MEMS sensor having two capacitors between a substrate and a mass body to detect an angular speed or acceleration according to capacitances each changing according to the coriolis force.

SUMMARY OF THE INVENTION

It is an object of the present invention to provide a capacitance difference detecting circuit and a MEMS sensor that detect a minute change in capacitances of two capacitors caused by an external force.

According to one of the aspects of the capacitance difference detecting circuit of the present invention, a plurality of oscillators each have a capacitor whose capacitance changes by an external force. Each of the oscillators generates a first oscillating signal according to the capacitance. A detecting unit detects a relative difference between the capacitances of the capacitors as a difference between frequencies of the first oscillating signals. This allows detection of a minute difference in the capacitances with high accuracy.

According to one of the aspects of the MEMS sensor of the present invention, a pair of first electrodes are formed on a substrate and a pair of second electrodes are formed on a mass body at positions to face the first electrodes. The mass body is displaceably disposed to face the substrate, oscillates in a direction perpendicular to the substrate, and is displaced by a coriolis force applied in a direction perpendicular to the direction of the oscillation. Further, each of a pair of capacitors is formed of the first electrode and the second electrode facing to each other. A pair of oscillators generate first oscillating signals according to capacitances of the capacitors, respectively. A detecting unit detects a relative difference between the capacitances of the capacitors as a difference between frequencies of the first oscillating signals. A main control unit calculates an angular speed or acceleration applied in a horizontal direction of the substrate according to a change in the frequencies detected by the detecting unit. This allows highly accurate detection of the capacitance difference caused by the angular speed or acceleration.

According to a preferable example of the above-described aspect of the capacitance difference detecting circuit and of the MEMS sensor of the present invention, at least one of the oscillators includes a variable capacitance diode whose capacitance is adjustable by a control voltage supplied to a control terminal. Consequently, the oscillator having the variable capacitance diode can change the frequency of the first oscillating signal by adjusting the capacitance thereof. Therefore, even with the plural oscillators having different oscillation frequencies due to a manufacturing error or the like, it is able to easily make them coincident with each other. In other words, even if the capacitance difference detecting circuit and the MEMS sensor are manufactured under relaxed conditions, the oscillation frequencies of the oscillators can be easily made coincident with each other. This consequently reduces the manufacturing cost.

According to a preferable example of the above-described aspect of the capacitance detecting circuit and the MEMS sensor of the present invention, a pair of oscillators each output the first oscillating signal. A mixer included in the detecting unit receives a pair of first oscillating signals and outputs a frequency difference signal with a frequency equal to a difference between the frequencies of the received first oscillating signals. This allows highly accurate detection of the capacitance difference by monitoring the frequency of the frequency difference signal.

According to a preferable example of the above-described aspect of the capacitance difference detecting circuit and of the MEMS sensor of the present invention, a frequency/voltage converting unit converts the frequency of the frequency difference signal to a detection voltage indicating the difference between the capacitances, which allows a simple circuit such as an AD converter to monitor the relative difference between the capacitances.

According to a preferable example of the above-described aspect of the capacitance difference detecting circuit and the MEMS sensor of the present invention, while receiving a mask signal that is activated when the difference between the frequencies of the pair of first oscillating signals is small, the frequency/voltage converting unit outputs the detection voltage indicating that the difference between the capacitances is zero. This eliminates a need for an operation of judging the frequency difference signal with a frequency within a range in which detection is unnecessary (a frequency equal to or lower than a predetermined frequency), which can reduce the power consumption by an amount equivalent to one for the judging operation.

According to a preferable example of the above-described aspect of the capacitance difference detecting circuit and of the MEMS sensor, the capacitors constituting the oscillators have different capacitances of from each other in an initial state in which the external force is not applied. Accordingly, the frequencies of the first oscillating signals differ from each other in the initial state. In the initial state, the mixer outputs the frequency difference signal representing an initial frequency as the difference between the frequencies of the first oscillating signals. Differentiating the frequencies of the oscillating signals from each other, in other words, setting a predetermined offset in advance in the initial state eliminates a need for precisely setting to zero the frequency of the frequency difference signal outputted by the mixer in the initial state. As a result, it is possible to configure the mixer with a simple circuit, reducing the design cost and manufacturing cost.

According to a preferable example of the above-described aspect of the capacitance difference detecting circuit and the MEMS sensor of the present invention, a frequency comparator compares the frequencies of the first oscillating signals in magnitude, so that it is possible to determine not only the difference between the capacitances but also the magnitude relation between the capacitances.

According to a preferable example of the above-described aspect of the capacitance difference detecting circuit and the MEMS sensor of the present invention, while receiving a mask signal that is activated when the difference between the frequencies is small, the mixer outputs the frequency difference signal indicating that the difference between the frequencies of the pair of first oscillating signals is zero. This eliminate a need for an operation of judging the frequency difference signal with a frequency within a range in which detection is not required (a frequency equal to or lower than a predetermined frequency), which can reduce the power consumption by an amount equivalent to one for the judging operation.

According to a preferable example of the above-described aspect of the capacitance difference detecting circuit and the MEMS sensor of the present invention, a pair of PLL circuits are disposed between the oscillators and the mixer respectively. Each of the PLL circuits receives the first oscillating signal from the oscillator, generates a second oscillating signal with a frequency that is higher than the frequency of the first oscillating signal, and outputs the generated second oscillating signal to the mixer as the first oscillating signal. This can heighten the frequency of the frequency difference signal outputted by the mixer and thus enhance sensitivity for detecting the capacitance difference.

According to a preferable example of the above-described aspect of the capacitance difference detecting circuit and the MEMS sensor of the present invention, each of the PLL circuits has an input terminal and a built-in frequency divider. In an initial state in which the external force is not applied, the input terminal is supplied with a value set to change a frequency division ratio of the frequency divider in order to change the frequency of the second oscillating signal outputted from the PLL circuit, so that the mixer can receive the second oscillating signals with the same frequency.

According to a preferable example of the above-described aspect of the capacitance difference detecting circuit and the MEMS sensor of the present invention, each of the PLL circuits includes the frequency divider having a fractional dividing function, thereby enabling minute adjustment of the frequency division ratio. Consequently, it is possible to surely make the frequencies of the oscillating signals to be supplied to the mixer coincide with each other in the initial state in which the external force is not applied.

According to a preferable example of the above-described aspect of the capacitance difference detecting circuit and the MEMS sensor of the present invention, one of the oscillators is connected to the mixer via the PLL circuit. Therefore, the mixer is supplied, at its one input, with a second oscillating signal having a frequency higher than that of one of the first oscillating signals. In the initial state in which the external force is not applied, a dividing control unit changes a frequency division ratio of a frequency divider in order to make the frequency of the second oscillating signal coincide with that of the other one of the first oscillating signals. Therefore, it is able to automatically make the frequencies of the oscillating signals to be supplied to the mixer coincide with each other even when the capacitances of the capacitors of the pair of the oscillators differ from each other in the initial state.

According to a preferable example of the above-described aspect of the capacitance difference detecting circuit, each of the capacitors of a pair of oscillators is constituted of a first electrode formed on a substrate and a second electrode formed on a mass body to face the first electrode. The mass body is displaceably disposed to face the substrate and oscillates in a direction perpendicular to the substrate. Each of the oscillators generates a first oscillating signal with a frequency determined by the capacitance of the capacitor. The capacitance is changed when the mass body is displaced relative to the substrate by the external force. This can facilitate detecting the difference between the capacitances that change according to the external force.

According to another aspect of the capacitance difference detecting circuit of the present invention, a pair of oscillators each have a capacitors whose capacitance changes according to an external force and generate a first oscillating signal according to the capacitances. A pair of PLL circuits have voltage controlled oscillators and receive the first oscillating signals from the oscillators to output second oscillating signals from the voltage controlled oscillators respectively. A detecting unit receives input voltages to be inputted to the respective voltage controlled oscillators of the PLL circuits. The input voltages are adjusted in accordance with the frequencies of the first oscillating signals and of the second oscillating signals. The detecting unit detects a difference between the received input voltages as a relative difference between the capacitances. In other words, the detecting unit detects the relative difference between the capacitances of the capacitors as the difference between the input voltages, which allows detection of a minute capacitance difference with high accuracy.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
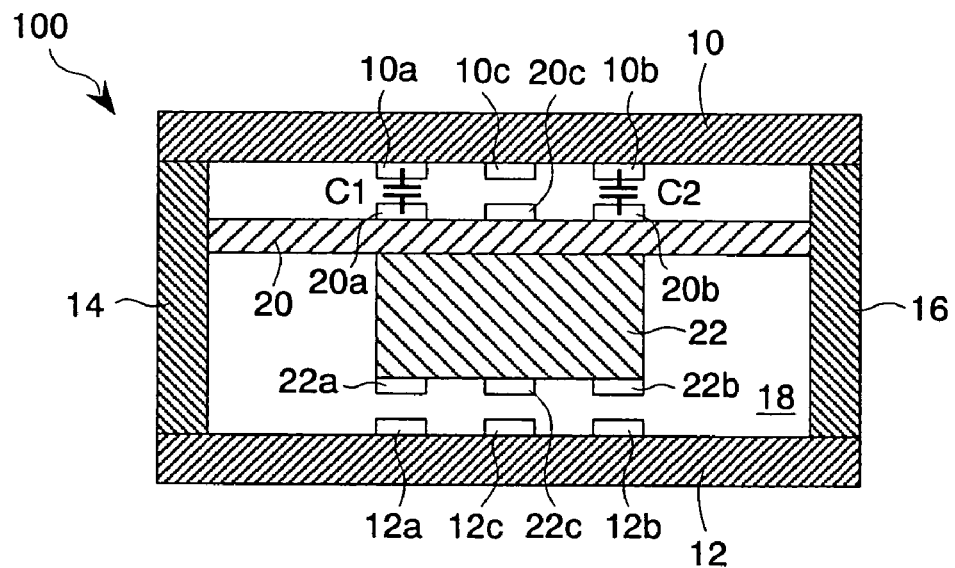
FIG. 1 is a cross-sectional view showing a MEMS unit that is an essential part of a first embodiment of the capacitance difference detecting circuit and the MEMS sensor of the present invention.

Hereinafter, embodiments of the present invention will be described, using the drawings. Signals supplied via external terminals are designated by the same reference numerals and symbols as the names of the terminals. Further, signal lines through which signals are transmitted are designated by the same reference numerals and symbols as the names of the signals.

FIG. 1 shows a MEMS unit 100 that is an essential part of a first embodiment of the capacitance difference detecting circuit and the MEMS sensor of the present invention. The capacitance difference detecting circuit and the MEMS sensor are formed on a semiconductor substrate such as a silicon substrate through the use of semiconductor manufacturing technology (for example a CMOS process). In this embodiment, the MEMS sensor is a so-called uniaxial sensor and it has the MEMS unit 100 and a capacitance difference detecting circuit 200 shown in FIG. 4. The MEMS sensor is applied as, for example, a sensor for actuating an airbag mounted in an automobile.

The MEMS unit 100 and the capacitance difference detecting circuit 200 are preferably formed on the same semiconductor substrate (one-chip structure). This is because capacitors C1, C2 constituting oscillators 30, 32 of the capacitance difference detecting circuit 200 are formed in the MEMS unit 100 as will be described later. The MEMS unit 100 and the capacitance difference detecting circuit 200 may be formed on different semiconductor substrates (two-chip structure).

The MEMS unit 100 of the MEMS sensor has a pair of glass substrates 10, 12 formed with a predetermined interval, silicon walls 14, 16 arranged on both ends (right and left in the drawing) of facing sides of the glass substrates 10, 12 to be perpendicular to the glass substrates 10, 12, and a space 18 formed inside the glass substrates 10, 12 and the silicon walls 14, 16. An oscillating plate 20 facing the glass substrate 10 is formed inside the space 18. The oscillating plate 20 is supported by the silicon walls 14, 16 at both ends (right and left in the drawing) thereof (beam structure), and a center portion thereof is movable (oscillatable) in the direction perpendicular to the glass substrates 10, 12. A weight 22 is formed on a surface of the oscillating plate 20 on a glass substrate 12. The oscillating plate 20 and the weight 22 form a mass body that oscillates in the direction perpendicular to the substrate 10 (in an up and down direction in the drawing).

A pair of first electrodes 10a, 10b and a driving electrode 10c are formed on a surface of the glass substrate 10 on an oscillating plate 20. The driving electrode 10c is formed between the first electrodes 10a, 10b. Second electrodes 20a, 20b and a driving electrode 20c are formed on a surface of the oscillating plate 20 on a glass substrate 10 at positions to face the first electrodes 10a, 10b and the driving electrode 10c respectively. The first and second electrodes 10a, 20a form the capacitor C1. The first and second electrodes 10b, 20b form the capacitor C2. Capacitances of the capacitors C1, C2 change according to the distance between the first electrodes and the second electrodes.

A pair of electrodes 22a, 22b and a driving electrode 22c are formed on a surface of the weight 22 on a glass substrate 12 side. The driving electrode 22c is formed between the electrodes 22a, 22b. A pair of electrodes 12a, 12b and a driving electrode 12c are formed on a surface of the glass substrate 12 on an oscillating plate 20 side at positions facing the electrodes 22a, 22b and the driving electrodes 22c respectively.

Figure 2:
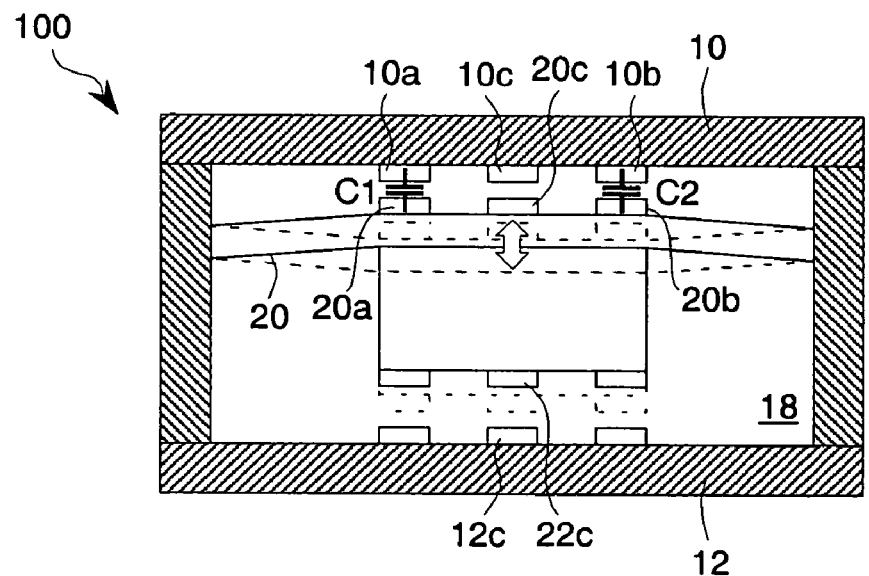
FIG. 2 is a cross-sectional view showing how an oscillating plate shown in FIG. 1 oscillates.

FIG. 2 shows how the oscillating plate 20 shown in FIG. 1 oscillates. The oscillating plate 20 oscillates in the direction perpendicular to the glass substrate 10 (the arrow and the oscillating plate 20 shown by the solid line and the broken line in the drawing) when a not-shown driving circuit switches between plus and minus (relative values) of voltages of the driving electrodes 10c, 20c and between plus and minus of voltages (relative values) of the driving electrodes 22c, 12c at a predetermined cycle (for example, several ten kHz). The oscillation changes the distance between the first electrodes 10a, 10b and the second electrodes 20a, 20b to change the capacitances of the capacitors C1, C2 periodically. A driving voltage generated by the driving circuit is constantly given to the driving electrodes 10c, 20c, 22c, 12c while the MEMS sensor is in operation.

Figure 3:
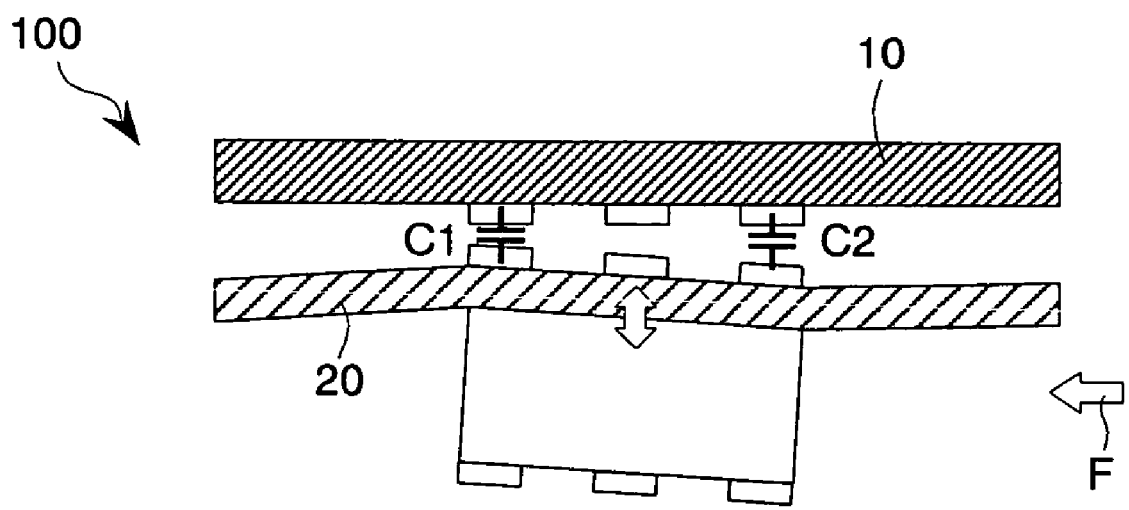
FIG. 3 is a cross-sectional view showing the state when an external force in a direction perpendicular to an oscillation direction is applied while the MEMS sensor is in operation.

FIG. 3 shows the state when an external force F (angular speed or acceleration) is applied in the direction perpendicular to the oscillation direction (horizontal direction of the glass substrate 10) while the MEMS sensor is in operation (while the oscillating plate 20 is oscillating). The oscillating plate 20 oscillates in the up and down direction in the drawing, so that the external force acts as a coriolis force. When the oscillating plate 20 is deformed by the coriolis force, the capacitances of the capacitors C1, C2 change. Then, the later-described capacitance difference detecting circuit 200 shown in FIG. 4 detects the change (difference) in the capacitances as the angular speed or acceleration given to the MEMS sensor.

Figure 4:
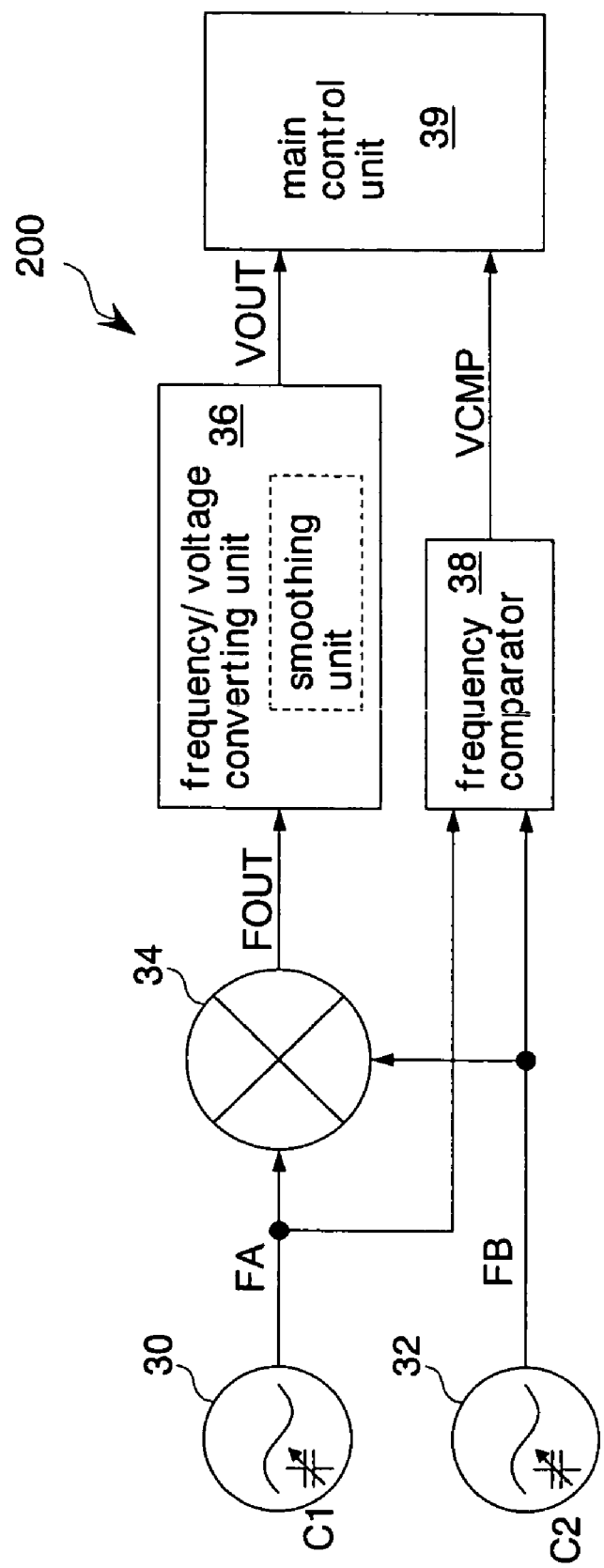
FIG. 4 is a block diagram showing the capacitance difference detecting circuit included in the MEMS sensor in the first embodiment.

FIG. 4 shows the capacitance difference detecting circuit 200 included in the MEMS sensor in the first embodiment. The capacitance difference detecting circuit 200 has the oscillator 30 generating an oscillating signal FA (first oscillating signal), the oscillator 32 generating an oscillating signal FB (first oscillating signal), a mixer 34, a frequency/voltage converting unit 36, a frequency comparator 38, and a main control unit 39. The frequency/voltage converting unit 36, the frequency comparator 38, and the main control unit 39 operate as a detecting unit that detects a relative difference between the capacitances of the capacitors C1, C2 as a difference between frequencies of the oscillating signals FA, FB, as will be described later.

The oscillators 30, 32 include the capacitors C1, C2 shown in FIG. 1 respectively. Therefore, the frequencies of the oscillating signals FA, FB generated by the oscillators 30, 32 change according to the change in the capacitances of the capacitors C1, C2. The mixer 34 detects a difference between the frequencies of the oscillating signals FA, FB and outputs a frequency difference signal FOUT having a frequency equal to this difference. The frequency/voltage converting unit 36, which has a smoothing unit, smoothes a positive voltage component of the frequency difference signal FOUT and outputs the smoothed voltage as a detection voltage VOUT according to the frequency difference. The detection voltage VOUT represents the difference between the capacitances of the capacitors C1, C2. In this embodiment, the detection voltage VOUT becomes 0 (zero) V when the frequency difference is zero and rises according to the increase in the frequency difference (absolute value).

The frequency comparator 38 compares the frequencies of the oscillating signals FA, FB to find the magnitude relation therebetween and outputs the comparison result as a compared signal VCMP. For example, assuming that a power supply voltage VCC supplied to the capacitance difference detecting circuit 200 is 3 V, the frequency comparator 38 outputs the compared signal VCMP whose voltage is 1.5 V (VCC/2) when "FA=FB" holds between the frequencies of the oscillating signals. The frequency comparator 38 outputs the compared signal VCMP having a higher voltage than 1.5 V when "FA>FB" holds between the frequencies of the oscillating signals, and outputs the compared signal VCMP having a lower voltage than 1.5 V when "FA<FB" holds therebetween. Therefore, the larger the frequency of the oscillating signal FA is than that of the oscillating signal FB (the smaller the capacitance of the capacitor C1 is than that of the capacitor C2), the higher the voltage of the compared signal VCMP is. The smaller the frequency of the oscillating signal FA is than that of the oscillating signal FB (the larger the capacitance of the capacitor C1 is than that of the capacitor C2), the lower the voltage of the compared signal VCMP is The main control unit 39 detects the difference between the capacitances of the capacitors C1, C2 and the change in the difference according to the detection voltage VOUT representing the difference between the frequencies of the oscillating signals FA, FB and the compared signal VCMP, and calculates, according to the detection result, the external force F (angular speed or acceleration) applied to the MEMS unit 100. Concretely, the main control unit 39 actuates the airbag when detecting the acceleration in a certain direction, which is larger than a predetermined value. For example, the detection voltage VOUT and the compared signal VCMP are converted to digital values by an AD converter in the main control unit 39. The main control unit 39 calculates the angular speed or acceleration according to the digital values resulting from the conversion. Note that the main control unit 39 controls the operation of the whole MEMS sensor.

Figure 5:
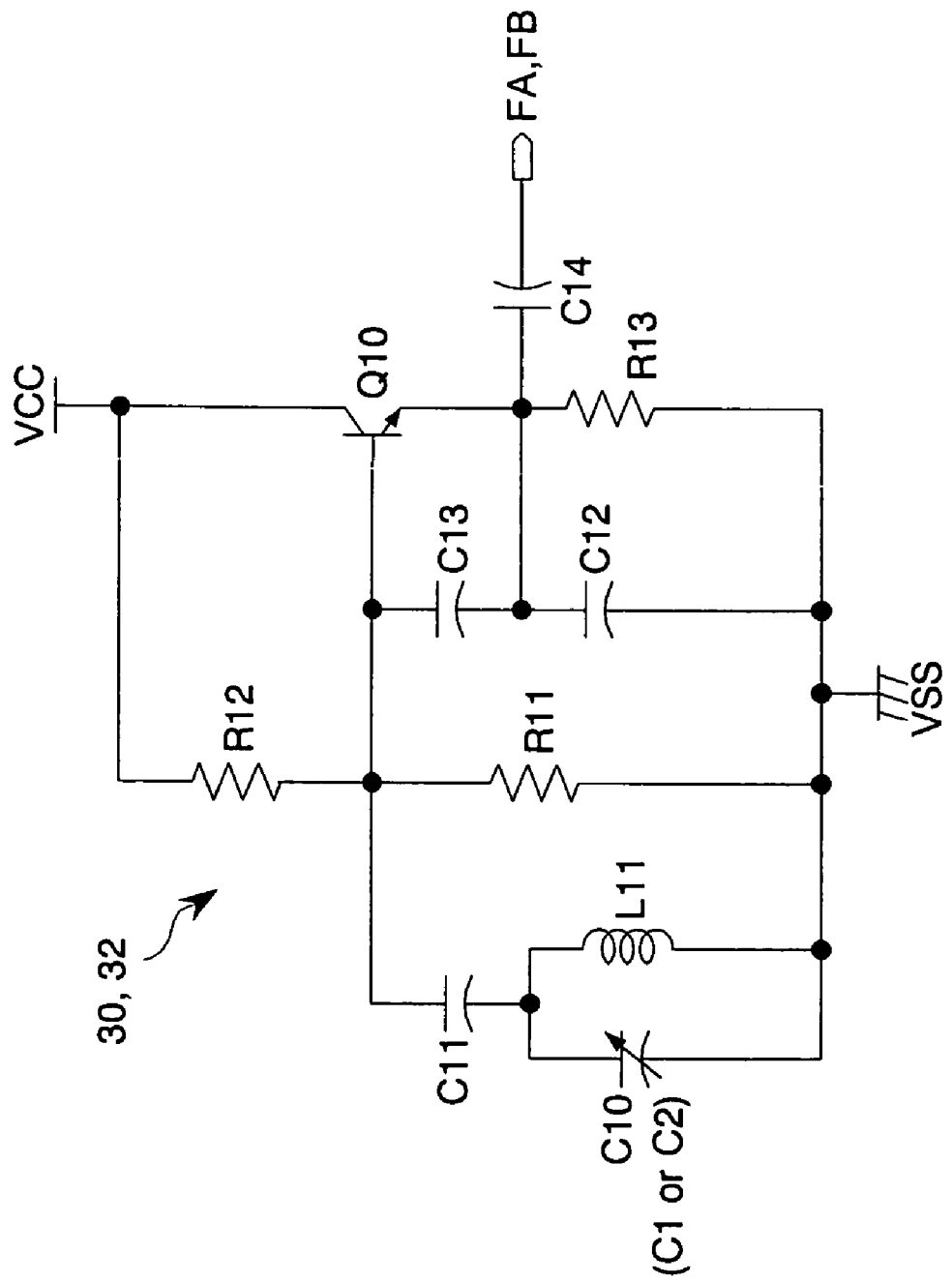
FIG. 5 is a circuit diagram showing a detailed configuration of oscillators shown in FIG. 4.

FIG. 5 shows a detailed configuration of the oscillators 30, 32 shown in FIG. 4. The oscillators 30, 32 have the same element configuration and are constituted of LC resonance circuits having the same characteristics. A capacitor C10 connected in parallel to a coil L11 corresponds to one of the capacitors C1, C2 formed in the MEMS unit 100 shown in FIG. 1. The frequency of the oscillating signal FA (or FB) depends on capacitances of capacitors (the total capacitance of C10, C11, C12, C13, and C14) and an inductance of the coil L11.

Generally, a frequency f of an oscillating signal outputted from an LC oscillator is expressed by the expression (1), where C is the total capacitance of capacitors and L is the inductance of a coil.

$$f=1/(2\pi \times sqrt(LC)) \tag{1}$$

Since the oscillators 30, 32 are the same in the total capacitance and the inductance, the frequencies of the oscillating signals FA, FB are equal to each other while the MEMS unit 100 is not receiving the external force F. Even when the oscillating plate 20 is oscillating, the capacitances of the capacitors C1, C2 change by the same degree if the external force F is not applied, and therefore, the frequencies of the oscillating signals FA, FB become equal to each other. The capacitances of the capacitors C1, C2 become different from each other when the external force F is applied as described in FIG. 3. Since the inductance L is constant, the frequencies of the oscillating signals FA, FB become different from each other according to the external force F (coriolis force).

In the above-described MEMS sensor, the capacitances of the capacitors C1, C2 formed between the oscillating plate 20 that oscillates and the glass substrate 10 change according to the coriolis force that acts on the oscillating plate 20 when the external force F is applied, so that these capacitances come to have different values from each other. Since the oscillators 30, 32 of the capacitance difference detecting circuit 200 constitute the resonance circuits including the capacitors C1, C2, the frequencies of the oscillating signals FA, FB change depending on the change in the capacitances of the capacitors C1, C2. Therefore, the mixer 34 detects the relative capacitance difference as the change (difference) in the frequencies.

As a concrete example, the following description shows the operation of the capacitance difference detecting circuit 200 when the capacitance of the capacitor C2 increases by 2 aF relative to the capacitance of the capacitor C1 due to the external force F applied to the MEMS sensor. Here, the total capacitance of the oscillators 30, 32 and the inductance L of the coil L11 when the external force F is not applied are assumed to be 4 pF and 6 nH respectively.

The frequencies of the oscillating signals FA, FB when the external force F is applied are derived from the aforementioned expression (1) as 1027.340950 MHz and 1027.340697 MHz respectively, assuming that the total capacitances of the oscillators 30, 32 are 4 pF and 4.000002 pF respectively. Therefore, the mixer 34 outputs the frequency difference signal FOUT having a frequency of 253 Hz. The frequency/voltage converting unit 36 converts the frequency of the frequency difference signal FOUT to the detection voltage VOUT representing the capacitance difference. Therefore, the main control unit 39 of the capacitance difference detecting circuit 200 is capable of detecting the capacitance difference which is as small as 2 aF as the frequency of 253 Hz. The main control unit 39 monitors the voltage of the compared signal VCMP outputted by the frequency comparator 38 to determine which one of the capacitors C1, C2 has a larger capacitance.

In this manner, the main control unit 39 detects the difference between the capacitances of the capacitors C1, C2 by monitoring the detection voltage VOUT and the compared signal VCMP to thereby detect, according to the detection result, the external force F (angular speed or acceleration) applied to the MEMS sensor.

As described above, in the first embodiment, the difference between the capacitances of the capacitors C1, C2 formed in the MEMS unit 100 is detected as the difference between the frequencies of the oscillating signals FA, FB, which allows high accuracy detection of a minute capacitance difference. As a result, the external force F (angular speed or acceleration) applied in the horizontal direction of the substrate 10 can be calculated with high accuracy according to the detected frequency change.

The mixer 34 generates the frequency difference signal FOUT having a frequency representing the difference between the frequencies of the oscillating signals FA, FB, and the frequency/voltage converting unit 36 smoothes the voltage component of the frequency difference signal FOUT, so that the capacitance difference can be detected as the detection voltage VOUT. Therefore, the main control unit 39 is only required to calculate the angular speed or acceleration according to the voltage through the use of the AD converter or the like, which can simplify its circuit configuration.

The frequency comparator 38 compares the frequencies of the oscillating signals FA, FB to find the magnitude relation therebetween, which enables the determination of not only the capacitance difference but also the magnitude relation of the capacitances.

Figure 6:
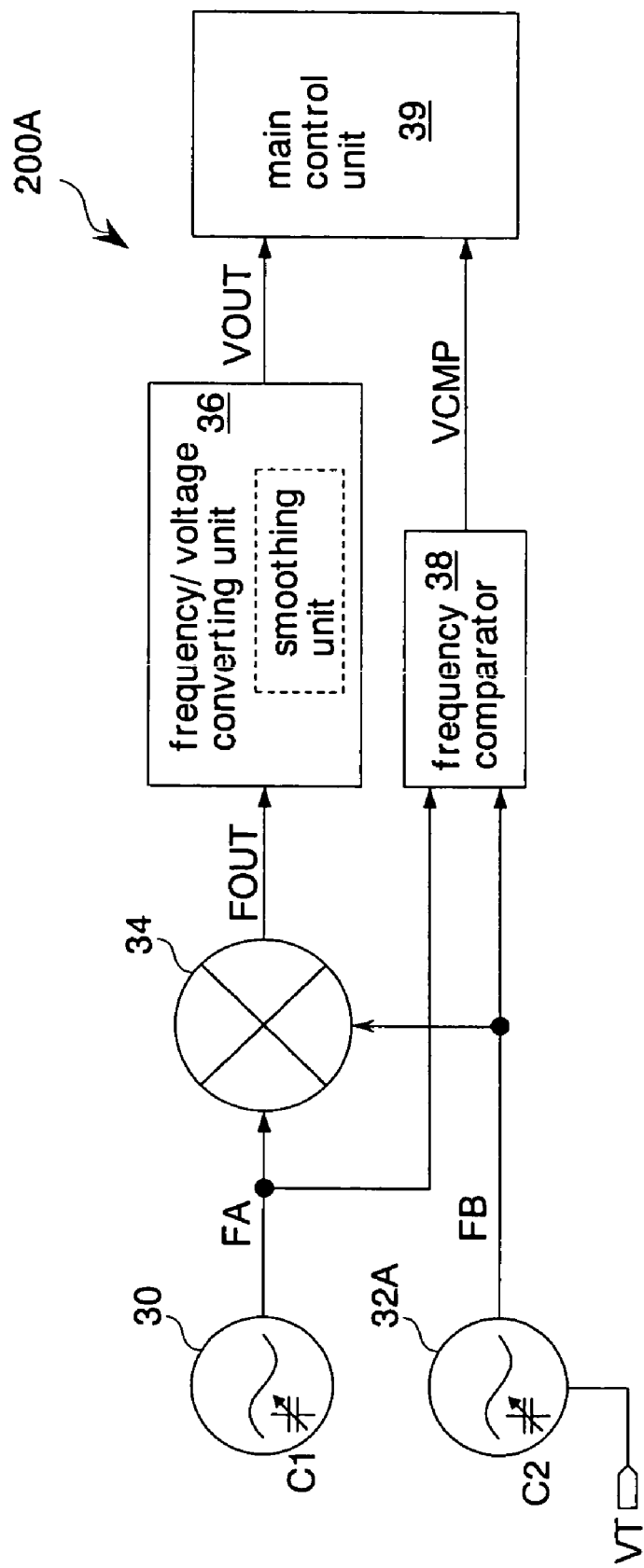
FIG. 6 is a block diagram showing an essential part of a second embodiment of the capacitance difference detecting circuit and the MEMS of the present invention.

FIG. 6 shows an essential part of a second embodiment of the capacitance detecting circuit and the MEMS sensor of the present invention. The same reference numerals and symbols are used to designate the same elements as those described in the first embodiment, and detailed description thereof will not be given. In this embodiment, an oscillator 32A of a capacitance difference detecting circuit 200A is different from the oscillator 32 of the first embodiment. The other configuration is the same as that of the first embodiment. This means that the MEMS sensor has the MEMS unit 100 shown in FIG. 1, and is applied as, for example, a sensor for actuating an airbag mounted in an automobile. The oscillator 32A has a control terminal VT, and an oscillating frequency thereof is adjustable according to a voltage applied to the control terminal VT.

Figure 7:
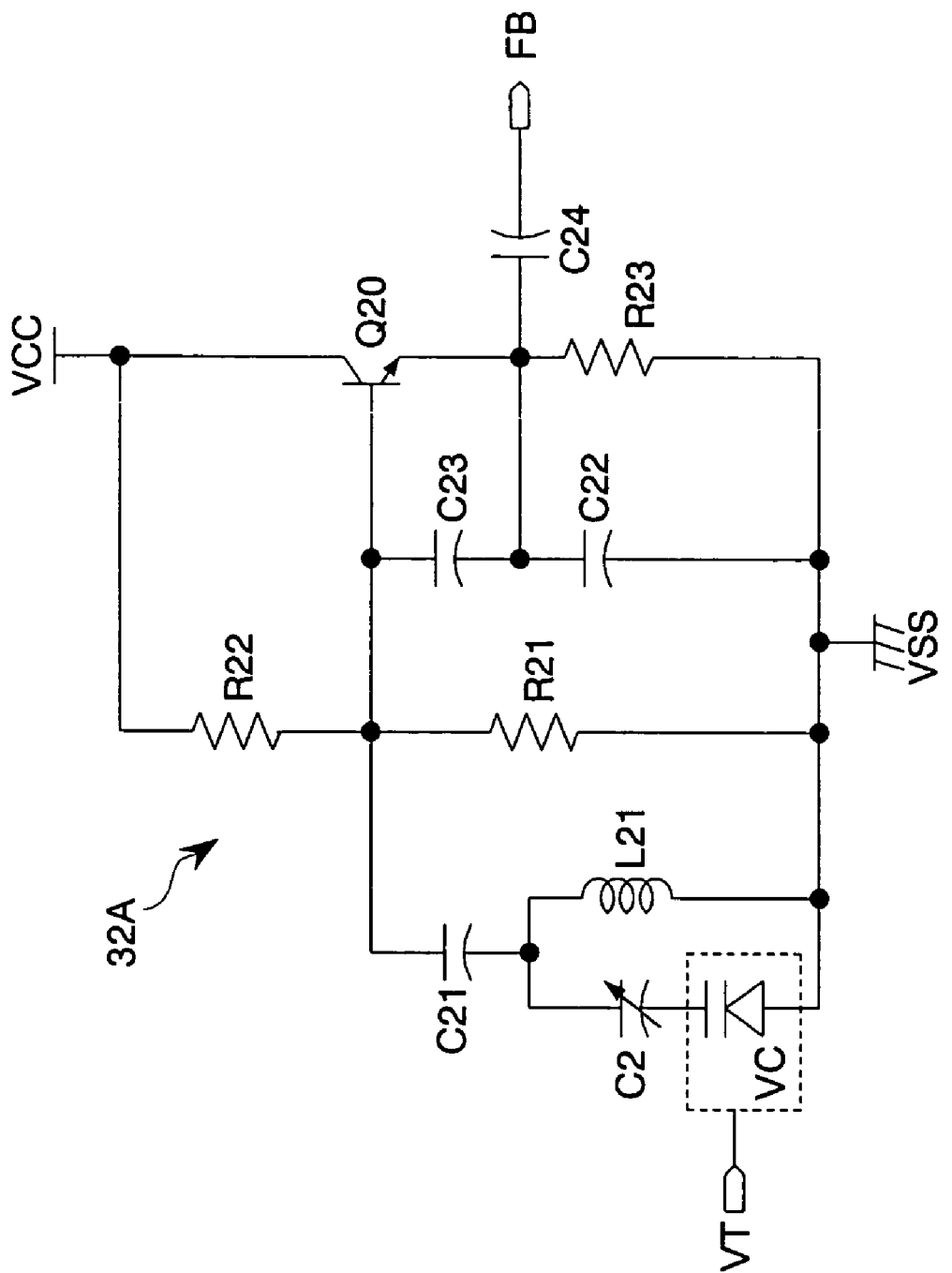
FIG. 7 is a circuit diagram showing in detail an oscillator 32A shown in FIG. 6.

FIG. 7 shows in detail the oscillator 32A shown in FIG. 6. The oscillator 32A is constituted of an LC resonance circuit similarly to the oscillator 30 (FIG. 5) of the first embodiment. Capacitors C21, C22, C23, C24, a coil L21, resistors R21, R22, R23, and a transistor Q20 of the oscillator 32A are formed to have the same characteristics as those of the capacitors C11, C12, C13, C14, the coil L11, resistors R11, R12, R13, and a transistor Q10 of the oscillator 30 respectively. This means that the oscillator 30 and the oscillator 32A have the same layout patterns of these elements. However, the oscillator 32A has a variable capacitance diode (varicap) VC connected in series to the capacitor C2. A capacitance of the capacitor C2 is different from a capacitance of the capacitor C1 in the state in which no external force F is applied. The total capacitance of the capacitor C2 and the variable capacitance diode VC is substantially the same as the capacitance of the capacitor C1 in the state in which no external force F is applied.

The variable capacitance diode VC has the control terminal VT receiving a control voltage VT for adjusting the capacitance. It is generally ideal that oscillators constituted of the same elements output oscillating signals with the same frequency. However, the characteristics of elements actually formed through the use of semiconductor manufacturing technology vary. Therefore, the frequencies of oscillating signals do not become precisely equal to one another. The capacitance of the variable capacitance diode VC is adjusted by the control voltage VT and the total capacitance of the oscillator 32A is made equal to the total capacitance of the oscillator 30, so that the frequencies of oscillating signals FA, FB can be made equal to each other even if a manufacturing error or the like exists. The frequencies of the oscillating signals FA, FB can be made equal to each other especially after the manufacturing of the MEMS sensor.

As described above, the same effects as those of the above-described first embodiment are obtainable also in the second embodiment. In addition, since the control voltage is supplied to the control terminal VT of the oscillator 32A, deviating frequencies of the oscillating signals FA, FB due to a manufacturing error or the like can be made equal to each other after the manufacturing of the MEMS senor. As a result, it is possible to relieve a failure in the MEMS sensor due to frequency discrepancy, thereby improving a manufacturing yield of the MEMS sensor. In other words, even if the capacitance difference detecting circuit 200A and the MEMS sensor are manufactured under relaxed conditions, it is possible to make the oscillating frequencies of the oscillators 30, 32A coincide with each other, resulting in a reduction in the manufacturing cost.

Figure 8:
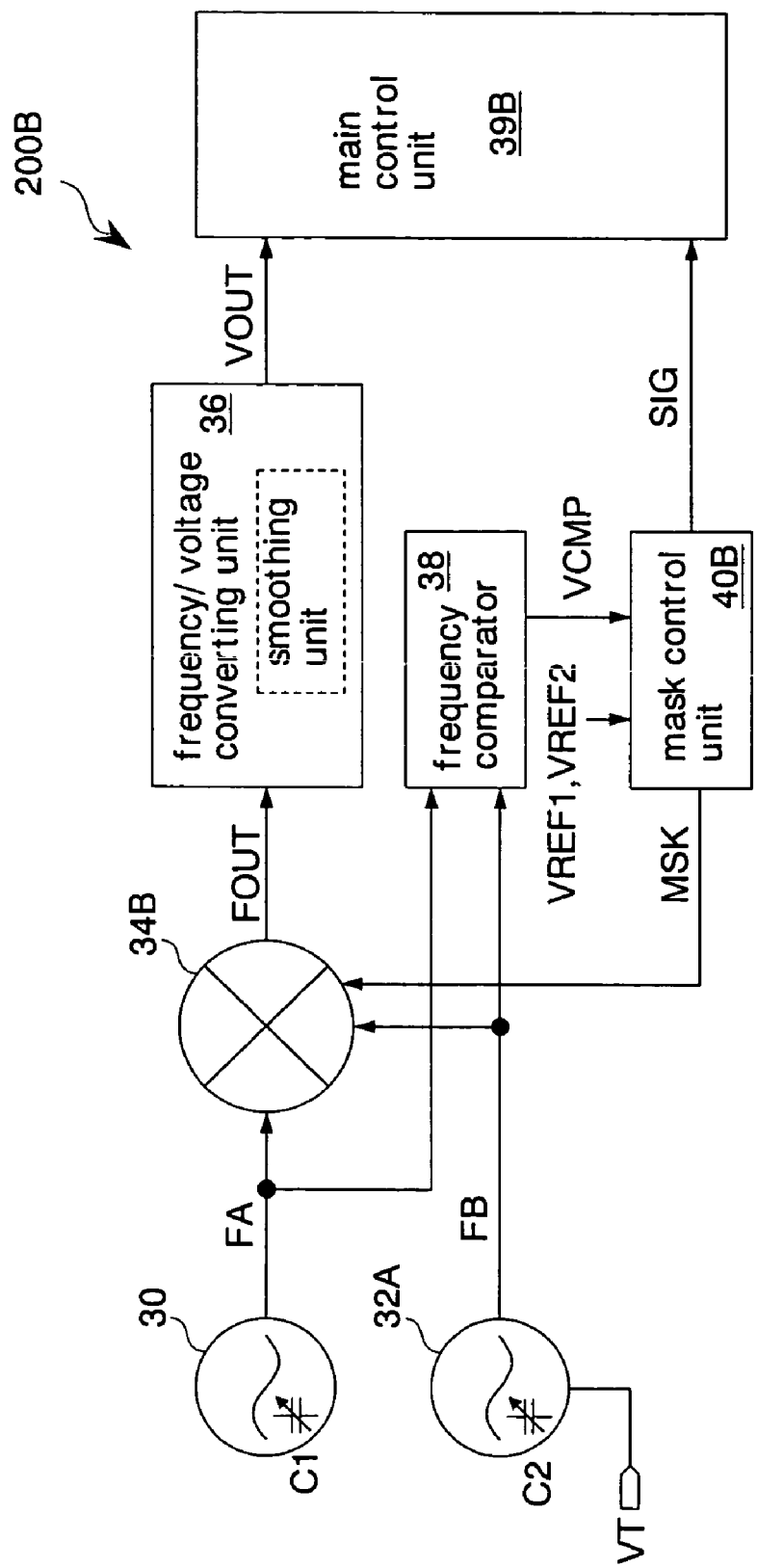
FIG. 8 is a block diagram showing an essential part of a third embodiment of the capacitance difference detecting circuit and the MEMS sensor of the present invention.

FIG. 8 shows an essential part of a third embodiment of the capacitance difference detecting circuit and the MEMS sensor of the present invention. The same reference numerals and symbols are used to designate the same elements as those described in the first and second embodiments, and detailed description thereof will not be given. In this embodiment, a capacitance difference detecting circuit 200B is formed in place of the capacitance difference detecting circuit 200A of the second embodiment. The MEMS sensor is the same as that of the first embodiment except the capacitance difference detecting circuit 200B. This means that the MEMS sensor has the MEMS unit 100 shown in FIG. 1 and is applied as, for example, a sensor for actuating an airbag mounted in an automobile.

The capacitance difference detecting circuit 200B is different from the capacitance difference detecting circuit 200A of the second embodiment in that it has a mixer 34B and a main control unit 39B in place of the mixer 34 and the main control unit 39. The capacitance difference detecting circuit 200B further has a mask control unit 40B. The other configuration is the same as that of the capacitance difference detecting circuit 200A of the second embodiment.

The mixer 34B has a function of being deactivated according to a mask signal MSK in addition to the function of the mixer 34 of the first embodiment. Specifically, in response to the activation of the mask signal MSK, the mixer 34B is deactivated to output a frequency difference signal FOUT whose frequency is zero. Therefore, while the mask signal MSK is activated, a frequency/voltage converting unit 36 determines that frequencies of oscillating signal FA, FB are equal to each other to output a detection voltage VOUT of 0 (zero) V representing frequency agreement, irrespective of the state of the MEMS unit 100.

The mask control unit 40B receives a compared signal VCMP and reference voltages VREF1, VREF2 (VREF1<VREF2), and it activates the mask signal MSK when a voltage of the compared signal VCMP falls between the reference voltages VREF1, VREF2. The mask control unit 40B deactivates the mask signal MSK when the voltage of the compared signal VCMP is lower than the reference voltage VREF1 or higher than the reference voltage VREF2. Further, the mask control unit 40B changes a sign signal SIG to low level when the voltage of the compared signal VCMP is lower than the reference voltage VREF1 and changes the sign signal SIG to high level when the voltage of the compared signal VCMP is higher than the reference voltage VREF2. The sign signal SIG is used for judging which one of the frequencies of the oscillating signals FA, FB is higher.

The main control unit 39B has substantially the same function as that of the main control unit 39 of the first embodiment. The main control unit 39B detects a difference between capacitances of capacitors C1, C2 and the change in the difference according to the detection voltage VOUT and the sign signal SIG and calculates, according to the detection results, an external force F (angular speed or acceleration) applied to the MEMS unit 100. The magnitude relation between the capacitances of the capacitors C1, C2 is determined based on the sign signal SIG. Then, the main control unit 39B actuates the airbag when detecting an acceleration larger than a predetermined value in a certain direction. Note that the main control unit 39B controls the operation of the whole MEMS sensor.

Figure 9:
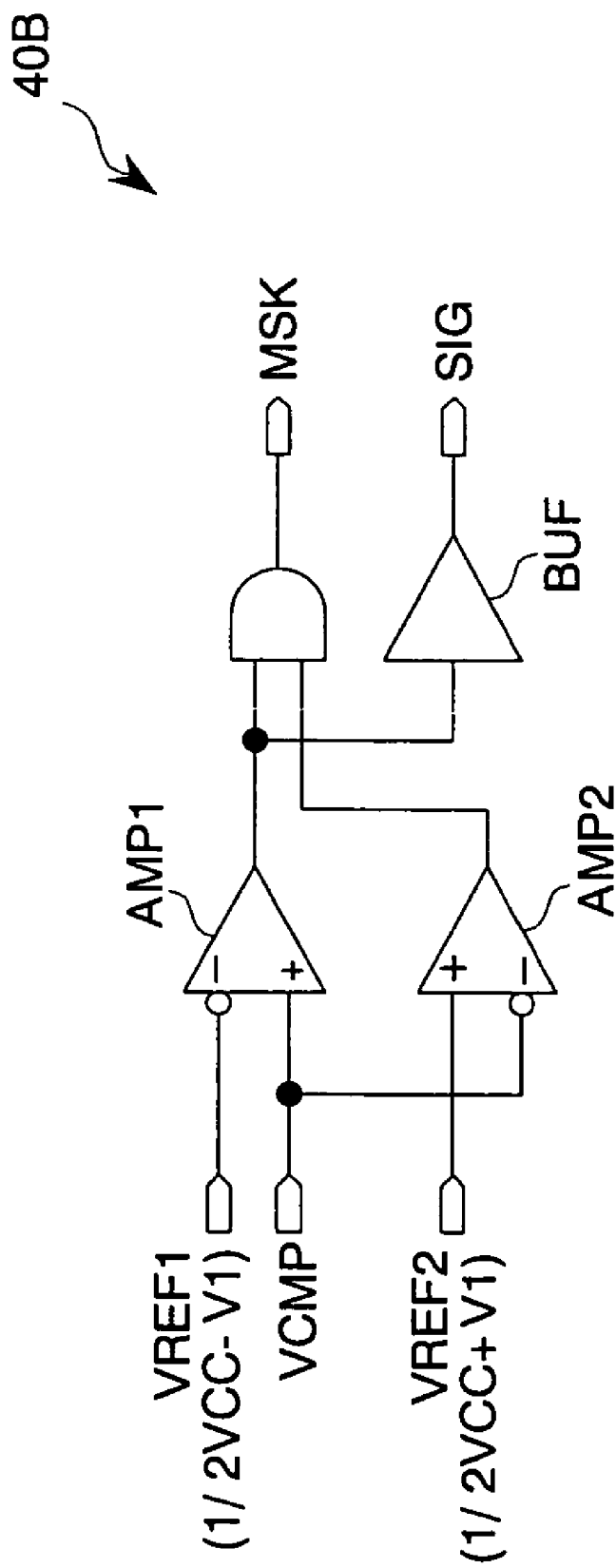
FIG. 9 is a circuit diagram showing in detail a mask control unit shown in FIG. 8.

FIG. 9 shows in detail the mask control unit 40B shown in FIG. 8. The mask control unit 40B has differential amplifiers AMP1, AMP2, an AND gate, and a buffer circuit BUF. The differential amplifier AMP1 outputs high level when the voltage of the compared signal VCMP is higher than the reference voltage VREF1, and outputs low level when the voltage of the compared signal VCMP is lower than the reference voltage VREF1. The reference voltage VREF1 is set to, for example, a value that is lower than VCC/2 by a threshold voltage V1 (VREF1=1.4 V assuming VCC=3V and V1=0.1 V).

The differential amplifier AMP2 outputs high level when the voltage of the compared signal VCMP is lower than the reference voltage VREF2, and outputs low level when the voltage of the compared signal VCMP is higher than the reference voltage VREF2. The reference voltage VREF2 is set to, for example, a value that is higher than VCC/2 by the threshold voltage V1 (VREF2=1.6 V assuming VCC=3V and V1=0.1 V).

The AND gate activates the mask signal MSK to high level when the voltage of the compared signal VCMP falls between the reference voltage VREF1 and the reference voltage VREF2, and deactivates the mask signal MSK to low level when the voltage of the compared signal VCMP is lower than the reference voltage VREF1 or higher than the reference voltage VREF2. The buffer circuit BUF converts an output voltage of the differential amplifier AMP1 to the sign signal SIG (binary logic signal representing high level or low level).

In the MEMS sensor of this embodiment, when the voltage of the compared signal VCMP is 1.4V to 1.6V, the mixer 34B outputs the frequency difference signal FOUT whose frequency is zero, and the frequency/voltage converting unit 36 outputs the detection voltage VOUT of 0 (zero) V signifying that the capacitances of the capacitors C1, C2 are equal to each other. Therefore, the main control unit 39B does not detect an angular speed or acceleration when the voltage of the compared signal VCMP is 1.4 V to 1.6V even if the capacitances differ from each other due to the external force F applied to the MEMS unit 100. Thus providing a dead zone of the capacitance change makes it possible to lower detection sensitivity to the angular speed or acceleration. Specifically, assuming, for example, that the frequency difference signal FOUT of 253 Hz is outputted when the difference between the capacitances of the capacitors C1, C2 is 2 aF similarly to the first embodiment, the mask signal MSK is activated when the capacitance difference is smaller than 2 aF, in other words, when the difference between the frequencies of the oscillating signals FA, FB is smaller than a preset 253 Hz. Consequently, the frequency of the frequency difference signal FOUT constantly becomes 0 (zero) Hz when it should be lower than 253 Hz. This makes it possible to prevent the main control unit 39B from operating in response to the frequency difference signal FOUT having a frequency within a range in which the detection is not necessary (a frequency equal to or lower than 253 Hz), so that power consumption can be reduced.

As described above, the same effects as those of the above-described first and second embodiments are obtainable also in the third embodiment. In addition, it is possible to prevent the main control unit 39B from operating in response to the frequency difference signal FOUT having a frequency within the range in which the detection is not necessary. As a result, power consumption while the MEMS sensor is in operation can be reduced.

Figure 10:
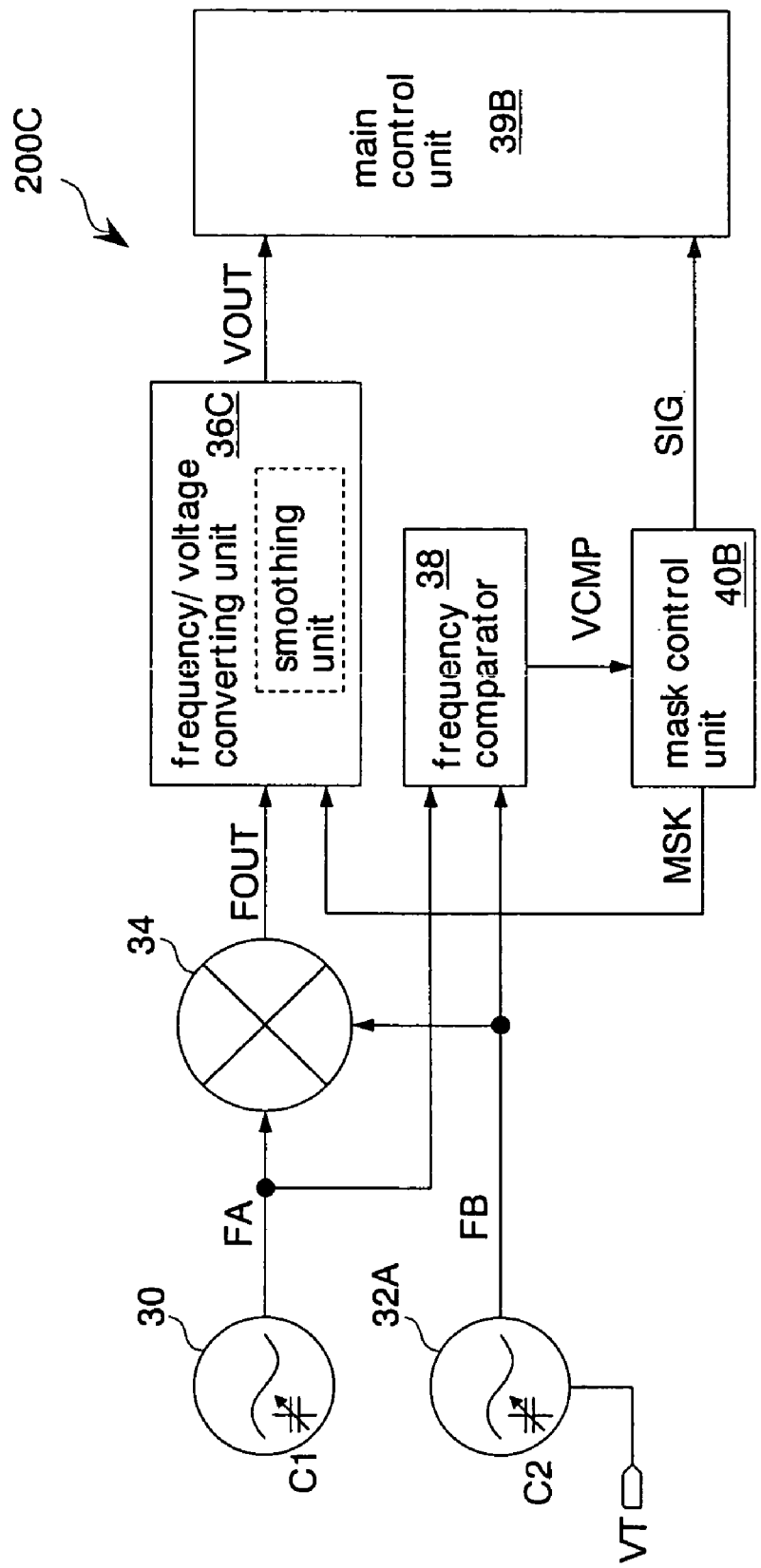
FIG. 10 is a block diagram showing an essential part of a fourth embodiment of the capacitance difference detecting circuit and the MEMS sensor of the present invention.

FIG. 10 shows an essential part of a fourth embodiment of the capacitance difference detecting circuit and the MEMS sensor of the present invention. The same reference numerals and symbols are used to designate the same elements as those described in the first to third embodiments, and detailed description thereof will not be given. In this embodiment, a capacitance difference detecting circuit 200C is formed in place of the capacitance difference detecting circuit 200B of the third embodiment. The MEMS sensor is the same as those of the first and second embodiments except the capacitance difference detecting circuit 200 C. This means that the MEMS sensor has the MEMS unit 100 shown in FIG. 1, and is applied as, for example, a sensor for actuating an airbag mounted in an automobile.

The capacitance difference detecting circuit 200C is the same as the capacitance difference detecting circuit 200B of the third embodiment except that a mixer 34 and a frequency/voltage converting unit 36C are different from the mixer 34B and the frequency/voltage converting unit 36. The frequency/voltage converting unit 36C has a function of being deactivated according to a mask signal MSK in addition to the function of the frequency/voltage converting unit 36 of the first embodiment. Specifically, the frequency/voltage converting unit 36C is deactivated in response to the activation of the mask signal MSK. At this time, irrespective of the state of the MEMS unit 100 (FIG. 1), the frequency/voltage converting unit 36C outputs a detection voltage VOUT of 0 (zero) V signifying that frequencies of oscillating signals FA, FB are equal to each other. Therefore, similarly to the third embodiment, a main control unit 39B does not detect an angular speed or acceleration when a difference between the frequencies of the oscillating signals FA, FB is smaller than a preset value (for example, when a voltage of a compared signal VCMP is 1.4 to 1.6 V) even if the capacitances differ from each other due to an external force F applied to the MEMS unit 100.

As described above, the same effects as those of the above-described first to third embodiments are obtainable also in the fourth embodiment.

Figure 11:
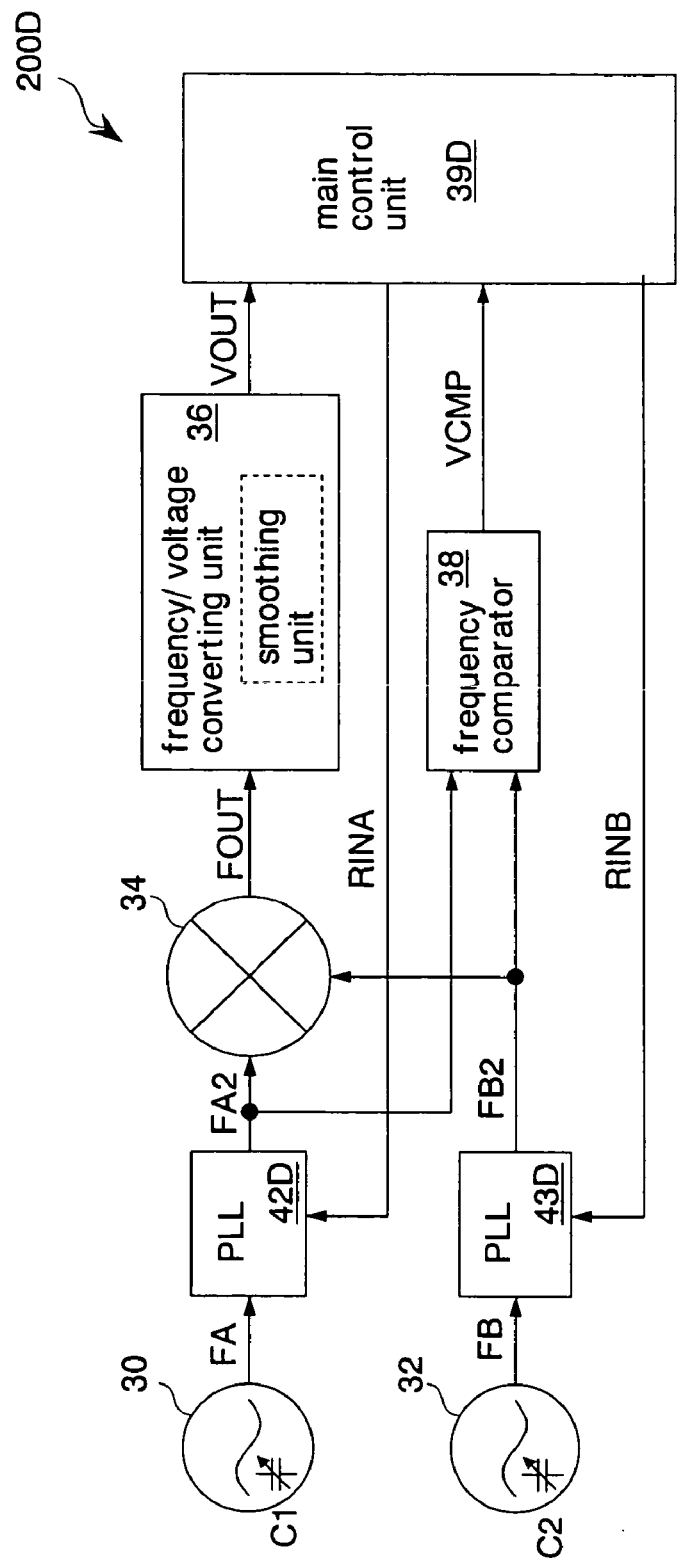
FIG. 11 is a block diagram showing an essential part of a fifth embodiment of the capacitance difference detecting circuit and the MEMS sensor of the present invention.

FIG. 11 shows an essential part of a fifth embodiment of the capacitance difference detecting circuit and the MEMS sensor of the present invention. The same reference numerals and symbols are used to designate the same elements as those described in the first embodiment, and detailed description thereof will not be given. The MEMS sensor has the MEMS unit 100 shown in FIG. 1 and a capacitance difference detecting circuit 200D, and is applied as, for example, a sensor for actuating an airbag mounted in an automobile.

The capacitance difference detecting circuit 200D has an oscillator 30 generating an oscillating signal FA (first oscillating signal), an oscillator 32 generating an oscillating signal FB (first oscillating signal), PLL circuits 42D, 43D receiving the oscillating signals FA, FB respectively, a mixer 34, a frequency/voltage converting unit 36, a frequency comparator 38, and a main control unit 39D. The PLL circuits 42D, 43D have the same circuit configuration. The main control unit 39D has a function of changing frequency division ratios of the PLL circuits 42D, 43D in addition to the function of the main control unit 39 of the first embodiment.

The PLL circuit 42D generates an oscillating signal FA2 (second oscillating signal) whose frequency is higher than that of the oscillating signal FA, according to the frequency division ratios of frequency dividers built therein. The PLL circuit 43D generates an oscillating signal FB2 (second oscillating signal) whose frequency is higher than that of the oscillating signal FB, according to the frequency division ratios of frequency dividers built therein. The PLL circuits 42D, 43D have input terminals (not shown) receiving changing signals RINA, RINB (set values) that are outputted from the main control unit 39D in order to change the frequency division ratios of the frequency dividers built therein. The mixer 34 detects a difference between the frequencies of the oscillating signals FA2, FB2 to output a frequency difference signal FOUT having a frequency equal to this frequency difference.

The PLL circuits 42D, 43D are interposed between the oscillators 30, 32 and the mixer 34, so that the frequencies of the oscillating signals FA2, FB2 to be supplied to the mixer 34 become higher than the frequencies of the oscillating signals FA, FB. Accordingly, the frequency of the frequency difference signal FOUT representing the frequency difference becomes higher. This enhances detection sensitivity to the change in capacitances of capacitors C1, C2. Specifically, assuming that the frequencies of the oscillating signals FA2, FB2 are made double the frequencies of the oscillating signals FA, FB, a capacitance difference of 1 aF can be detected when the frequency difference signal FOUT has a frequency of 253 Hz.

Figure 12:
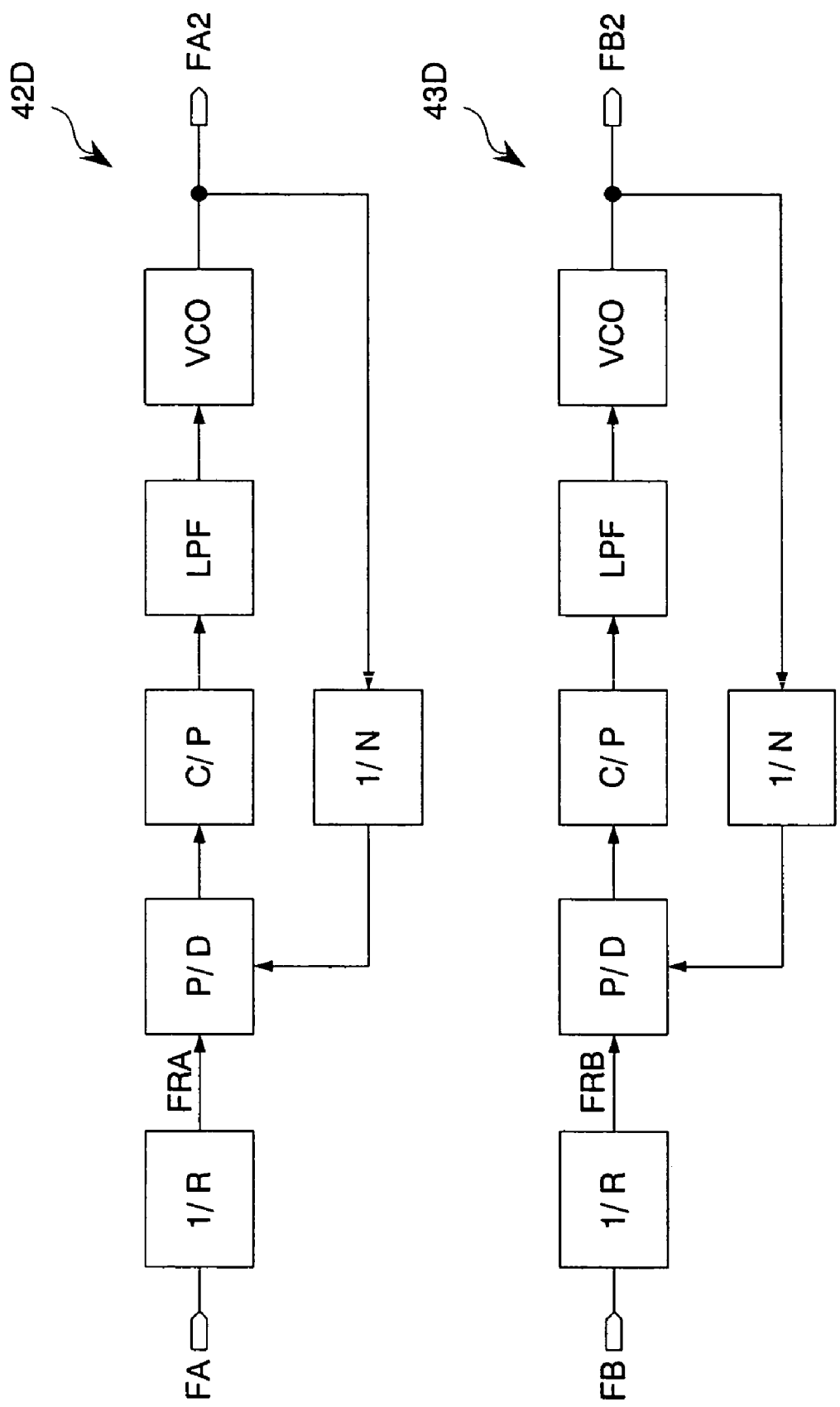
FIG. 12 is a block diagram showing in detail PLL circuits shown in FIG. 11.

FIG. 12 shows in detail the PLL circuits 42D, 43D shown in FIG. 11. Since the PLL circuit 42D, 43D have the same circuit configuration, only the PLL circuit 42D will be described here. The PLL circuit 42D has a frequency divider 1/R, a phase comparator P/D, a charge pump C/P, a low pass filter LPF, a voltage controlled oscillator VCO, and a frequency divider 1/N. Note that the main control unit 39D has a function of changing frequency division ratios of the frequency dividers 1/R, 1/N.

As in a typical PLL circuit, frequencies FVCO of the oscillating signals FA2, FB2 outputted from the PLL circuits 42D, 43D can be expressed by the expression (2), where FOSC is the frequency of each of oscillating signals FA, FB inputted to the PLL circuits 42D, 43D, R is the frequency division ratio of the frequency divider 1/R, and N is the frequency division ratio of the frequency divider 1/N.

$$FVCO = FOSC \times (N/R) \qquad (2)$$

Therefore, a smaller frequency division ratio R and a higher frequency division ratio N can increase the frequencies of the oscillating signals FA2, FB2. Further, the frequencies of the oscillating signals FA, FB are freely variable by changing the frequency division ratios R, N. Therefore, while no external force F is applied to the MEMS sensor (in an equilibrium state of the capacitors C1, C2), it is possible to make the frequencies of the oscillating signals FA, FB equal to each other by changing the frequency division ratios R, N. In other words, in this embodiment, it is not necessary to insert the variable capacitance diode VC in the oscillator 32A to adjust the capacitance by the control terminal VT as in the second embodiment (FIG. 6). Therefore, by changing the frequency division ratios R, N of at least one of the PLL circuits 42D, 43D, it is possible to make the frequencies of the oscillating signals FA, FB equal to each other even when the oscillators 30, 32 have a manufacturing error or the like.

As described above, the same effects as those of the above-described first and second embodiments are obtainable also in the fifth embodiment. In other words, by changing the frequency division ratios R, N of at least one of the PLL circuits 42D, 43D, the frequencies of the oscillating signals FA, FB, which are deviated from each other due to a manufacturing error or the like, can be made equal to each other after the MEMS sensor is manufactured. As a result, it is possible to relieve a failure in the MEMS sensor caused by frequency discrepancy to realize an improved manufacturing yield of the MEMS sensor. In other words, even if the capacitance difference detecting circuit 200D and the MEMS sensor are manufactured under relaxed conditions, the oscillating frequencies of the oscillators 30, 32 can be made equal to each other. As a result, manufacturing cost can be reduced.

Further, the frequencies of the oscillating signals FA2, FB2 to be supplied to the mixer 34 are made higher than the frequencies of the oscillating signals FA, FB outputted by the oscillators 30, 32 through the use of the PLL circuits 42D, 43D, so that the frequency of the frequency difference signal FOUT representing the frequency difference can be made higher. As a result, detection sensitivity to the change in the capacitances of the capacitors C1, C2 can be enhanced.

Figure 13:
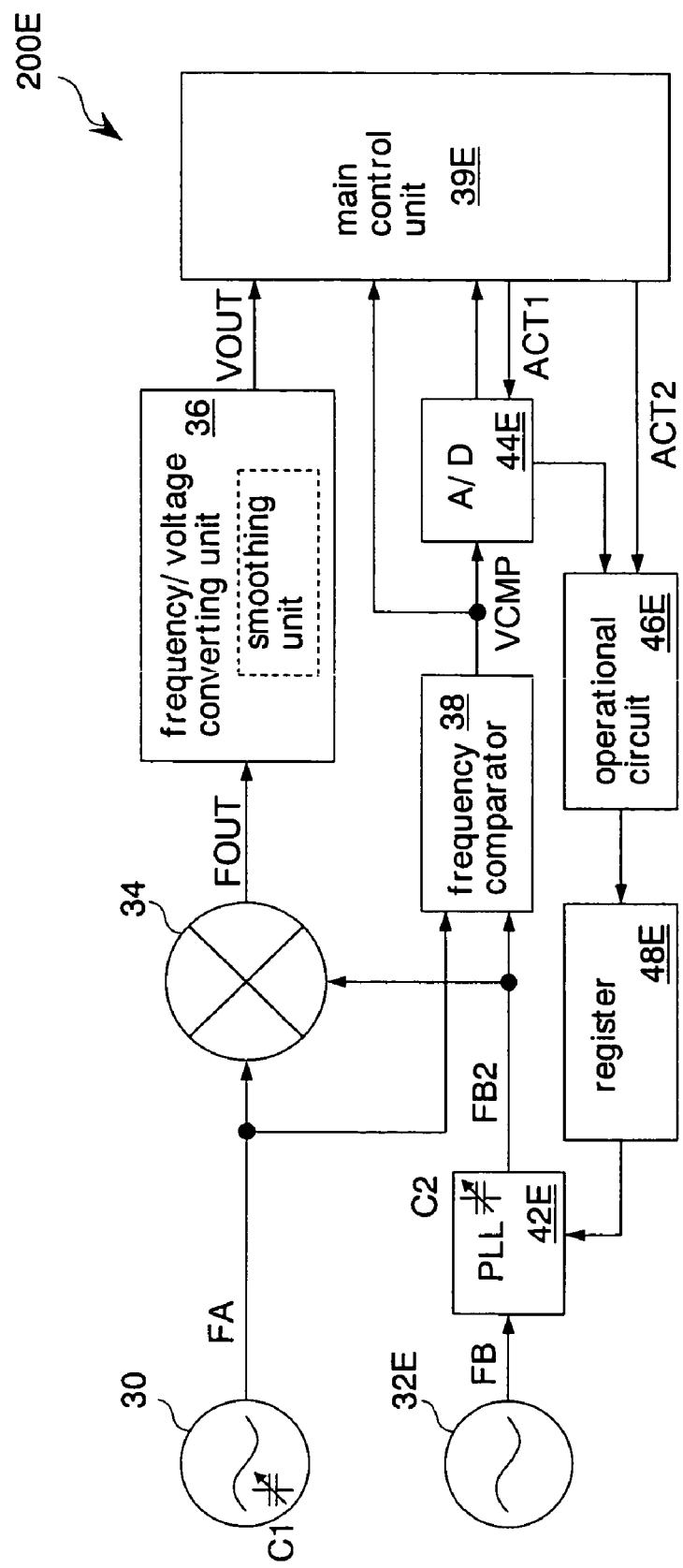
FIG. 13 is a block diagram showing an essential part of a sixth embodiment of the capacitance difference detecting circuit and the MEMS sensor of the present invention.

FIG. 13 shows an essential part of a sixth embodiment of the capacitance difference detecting circuit and the MEMS sensor of the present invention. The same reference numerals and symbols are used to designate the same elements as those described in the first and fifth embodiments, and detailed description thereof will not be given. The MEMS sensor has the MEMS unit 100 shown in FIG. 1 and a capacitance difference detecting circuit 200E, and is applied as, for example, a sensor for actuating an airbag mounted in an automobile.

The capacitance difference detecting circuit 200E has an oscillator 30 generating an oscillating signal FA (first oscillating signal), an oscillator 32E generating an oscillating signal FB (first oscillating signal), a PLL circuit 42E receiving the oscillating signal FB to output an oscillating signal FB2, a mixer 34 receiving the oscillating signals FA, FB2, a frequency/voltage converting unit 36, a frequency comparator 38, an AD converter 44E, an operational circuit 46E, a register 48E, and a main control unit 39E. The main control unit 39E has a function of controlling the operations of the AD converter 44E and the operational circuit 46E in addition to the function of the main control unit 39 of the first embodiment. As will be described later, the AD converter 44E, the operational circuit 46E, and the register 48E operate as a dividing control unit that changes frequency division ratios of frequency dividers of the PLL circuit 42E in order to make frequencies of the oscillating signals FA, FB2 equal to each other in an initial state in which no external force F is applied.

In this embodiment, the oscillator 30 (LC resonance circuit) is configured by using a capacitor C1 formed in the MEMS unit 100 (FIG. 1). A voltage controlled oscillator (not shown) in the PLL circuit 42E is constituted by using a capacitor C2 formed in the MEMS unit 100. The frequencies of the oscillating signals FA, FB should be ideally the same, but are slightly deviated from each other due to a manufacturing error or the like of elements in some cases.

While the external force F is not applied to the MEMS unit 100 (in an equilibrium state of the capacitors C1, C2; for example, during an initialization sequence of the MEMS sensor), the AD converter 44E operates in response to an activation signal ACT1 outputted from the main control unit 39E and converts a voltage of a compared signal VCMP outputted from the frequency comparator 38 to a digital value. The operational circuit 46E operates in response to an activation signal ACT2 outputted from the main control unit 39E and, according to the digital value outputted from the AD converter 44E, it calculates the frequency division ratios (the frequency division ratios R, N described in FIG. 12) of the PLL circuit 42E in order to make the frequencies of the oscillating signals FA, FB2 to be supplied to the mixer 34 equal to each other. The register 48E holds digital values representing the frequency division ratios outputted from the operational circuit 46E to output the held digital values to the PLL circuit 42E. The PLL circuit 42E changes the frequency division ratios of the frequency dividers (not shown) built therein according to the received digital values. Consequently, during the initialization sequence of the MEMS sensor, the frequency of the oscillating signal FB2 is automatically made equal to the frequency of the oscillating signal FA.

Specifically, for example, as described in FIG. 4, during the initialization sequence, the frequency comparator 38 outputs a compared signal VCMP having a voltage higher than 1.5 V when FA>FB2 holds between the frequencies. In order to make the frequencies FA=FB2, the operational circuit 46E calculates the frequency division ratios of the PLL circuit 42E according to the digital values, and outputs, to the PLL circuit 42E via the register 48E, set values to set the frequency division ratios of the PLL circuit 42E to the calculated values. The PLL circuit 42E changes the frequency division ratios according to the set values which are supplied thereto via the register 48E. This causes the frequencies of the oscillating signals FA, FB2 to be equal to each other.

After the frequencies of the oscillating signals FA, FB2 are made equal to each other during the initialization sequence, the main control unit 39E deactivates the activation signals ACT1, ACT2 to stop the operations of the AD converter 44E and the operational circuit 46E. The power consumption is reduced by the suspension of the operations of the AD converter 44E and the operational circuit 46E while the MEMS sensor is in operation. After the stopping of the operations of the AD converter 44E and the operational circuit 46E, the register 48E keeps holding the latest written set values (for making the frequencies of the oscillating signals FA, FB2 equal to each other) representing the frequency division ratios. Consequently, after the MEMS sensor starts operating, the frequencies of the oscillating signals FA, FB2 are equal to each other in the equilibrium state in which the external force F is not applied to the MEMS unit 100.

Note that constituting the register 48E of a nonvolatile memory makes it possible to set the frequency division ratios for making the frequencies of the oscillating signals FA, FB2 to be equal to each other during a manufacturing process (a test process) of the MEMS sensor. Therefore, the frequencies of the oscillating signals FA, FB which are deviated from each other due to a manufacturing error or the like can be made equal to each other after the MEMS sensor is manufactured. As a result, similarly to the second and fifth embodiments, it is possible to relieve the MEMS sensor from a failure caused by frequency discrepancy to improve a manufacturing yield of the MEMS sensor, so that the manufacturing cost can be reduced.

As described above, the same effects as those of the above-described first, second, and fifth embodiments are obtainable also in the sixth embodiment.

Figure 14:
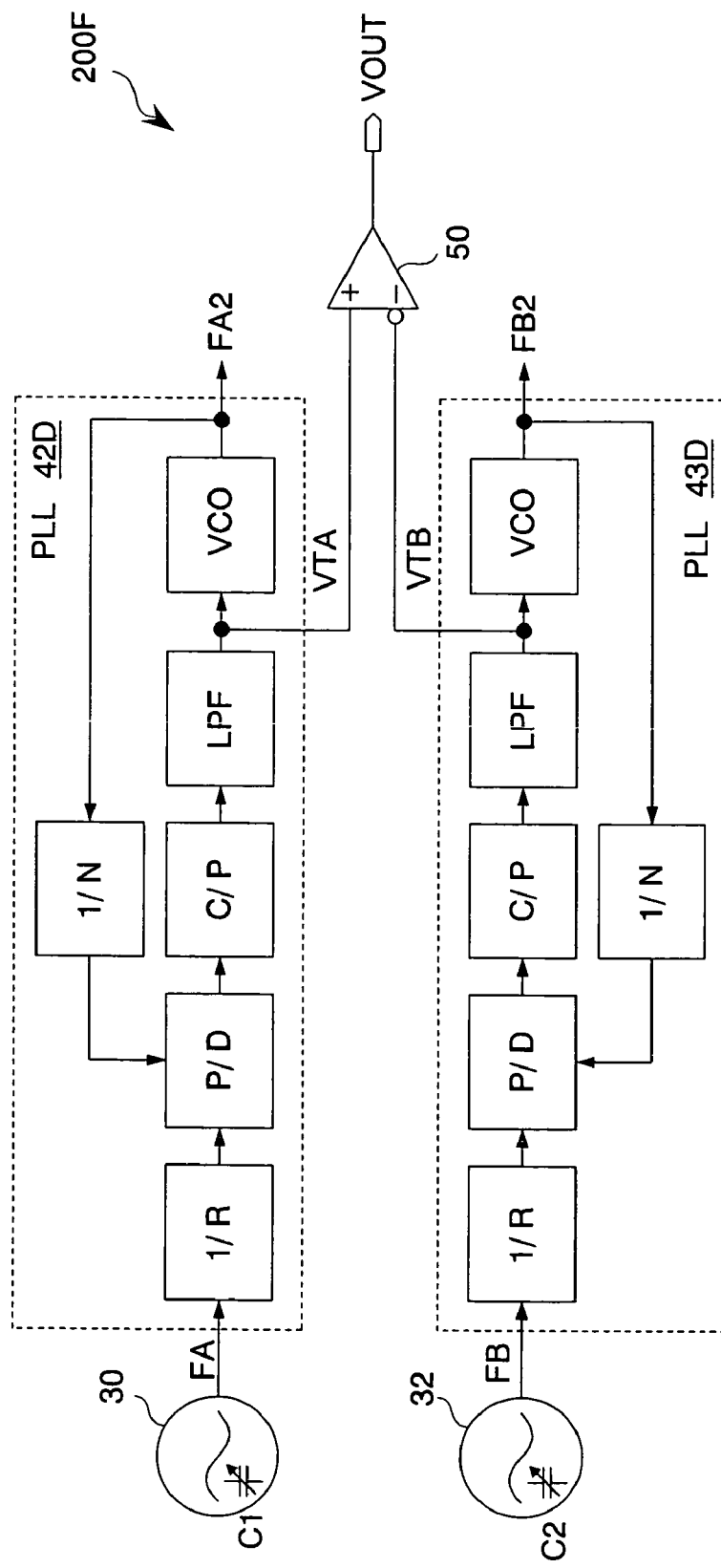
FIG. 14 is a block diagram showing an essential part of a seventh embodiment of the capacitance difference detecting circuit and the MEMS sensor the present invention.

FIG. 14 shows an essential part of a seventh embodiment of the capacitance difference detecting circuit and the MEMS sensor of the present invention. The same reference numerals and symbols are used to designate the same elements as those described in the first and fifth embodiments, and detailed description thereof will not be given. The MEMS sensor has the MEMS unit 100 shown in FIG. 1 and a capacitance difference detecting circuit 200F, and is applied as, for example, a sensor for actuating an airbag mounted in an automobile.

The capacitance difference detecting circuit 200F has oscillators 30, 32 generating oscillating signals FA, FB respectively, a PLL circuit 42D receiving the oscillating signal FA to output an oscillating signal FA2, a PLL circuit 43D receiving the oscillating signal FB to output an oscillating signal FB2, and a differential amplifier 50 receiving input voltages VTA, VTB of voltage controlled oscillators VCO of the PLL circuits 42D, 43D to output a difference between the input voltages VTA, VTB as a detection voltage VOUT. The differential amplifier 50 operates as a detecting unit that detects a relative difference between capacitances of capacitors C1, C2 as a difference between frequencies of the oscillating signals FA, FB, as will be described later.

In this embodiment, the input voltages VTA, VTB of the voltage controlled oscillators VCO are directly compared by the differential amplifier 50, so that the difference between the capacitances of the capacitors C1, C2 is detected while the MEMS sensor is in operation. Note that, when the capacitances of the capacitors C1, C2 are different from each other in the state in which no external force F is applied to the MEMS unit 100 (FIG. 1) (in an equilibrium state of the capacitors C1, C2) due to a manufacturing error or the like of the MEMS sensor, the input voltages VAT, VTB are also different from each other. In this case, a register holding the detection voltage VOUT in the equilibrium state as a correction value (digital value) is formed and the detection voltage VOUT outputted while the MEMS sensor is in operation is corrected according to the correction value held by the register, so that detection accuracy of the capacitance difference can be improved.

As described above, the same effects as those of the above-described first and second embodiments are obtainable also in the seventh embodiment.

Note that in the above-described first, second, fifth, and six embodiments, the frequencies of the pair of oscillating signals to be supplied to the mixer 34 may be made different from each other in advance in the equilibrium state (initial state) when no external force F is applied to the MEMS unit 100. In this case, the mixer 34 outputs the frequency difference signal FOUT with a predetermined frequency during the equilibrium state. Therefore, the frequency difference signal FOUT with an offset whose frequency is not zero is outputted in the equilibrium state. This eliminates a need for setting the frequency of the frequency difference signal FOUT to zero accurately in the equilibrium state, so that the mixer 34 can be configured with a simple circuit and thus the design cost and manufacturing cost can be reduced.

The mask control unit 40B of the third or fourth embodiment may be formed in each of the capacitance difference detecting circuits of the above-described first, fifth, and sixth embodiments, thereby preventing the main control unit from operating in response to the frequency difference signal FOUT having a frequency within a range in which the detection is not necessary.

Constituting the PLL circuit in each of the above-described fifth to seventh embodiments using a frequency divider having a fractional dividing function enables minute adjustment of the frequency division ratios. This makes it possible to surely make the frequencies of the oscillating signals to be supplied to the mixer equal to each other in the initial state in which no external force F is applied.

The above-described first to seventh embodiments have described examples where the MEMS sensor is constituted by using the pair of capacitors C1, C2 whose capacitances change according the external force F respectively. The present invention is not limited to such embodiments. For example, a biaxial or triaxial MEMS sensor that operates with high accuracy can be constituted, using two or three pairs of capacitors. In this case, two MEMS units 100 or three MEMS units 100 are arranged along the axes different from one another.

The invention is not limited to the above embodiments and various modifications may be made without departing from the spirit and scope of the invention. Any improvement may be made in part or all of the components.

What is claimed is:

1. A capacitance difference detecting circuit comprising:
a pair of oscillators having capacitors whose capacitances change according to an external force and generating first oscillating signals according to the capacitances, respectively;
a detecting unit detecting a relative difference between the capacitances as a difference between frequencies of the first oscillating signals;
a mask control unit that activates a mask signal when the difference between the frequencies of the pair of first oscillating signals is smaller than a preset value, wherein
said detecting unit includes a mixer receiving a pair of first oscillating signals and outputting a frequency difference signal with a frequency equal to a difference between frequencies of the received pair of first oscillating signals, and a frequency/voltage converting unit that converts the frequency of the frequency differences signal to a detection voltage indicating the relative difference between the capacitances and
while receiving the activated mask signal, said frequency/voltage converting unit outputs the detection voltage indicating that the difference between the capacitances is zero.

2. A capacitance difference detecting circuit comprising:
a pair of oscillators having capacitors whose capacitances chance according to an external force and generating first oscillating signals according to the capacitances, respectively;
a detecting unit detecting a relative difference between the capacitances as a difference between frequencies of the first oscillating signals;
a frequency comparator comparing the frequencies of the first oscillating signals in magnitude, wherein
said detecting unit includes a mixer receiving a pair of first oscillating signals and outputting a frequency difference signal with a frequency equal to a difference between frequencies of the received pair of first oscillating signals.

3. A capacitance difference detecting circuit comprising:
a pair of oscillators having capacitors whose capacitances chance according to an external force and generating first oscillating signals according to the capacitances, respectively;
a detecting unit detecting a relative difference between the capacitances as a difference between frequencies of the first oscillating signals; and
a mask control unit that activates a mask signal when the difference between the frequencies of the pair of first oscillating signals is smaller than a preset value, wherein
said detecting unit includes a mixer receiving a pair of first oscillating signals and outputting a frequency difference signal with a frequency equal to a difference between frequencies of the received pair of first oscillating signals, and
while receiving the activated mask signal, said mixer outputs the frequency difference signal indicating that the difference between the frequencies of the first oscillating signals is zero.

4. A capacitance difference detecting circuit comprising:
a pair of oscillators having capacitors whose capacitances chance according to an external force and generating first oscillating signals according to the capacitances, respectively;

a detecting unit detecting a relative difference between the capacitances as a difference between frequencies of the first oscillating signals; and a pair of PLL circuits disposed between said oscillators and said mixer, respectively, receiving the first oscillating signals from said oscillators to generate second oscillating signals having frequencies that are higher than the frequencies of the first oscillating signals, respectively, and outputting the generated second oscillating signals to said mixer as the first oscillating signals, wherein said detecting unit includes a mixer receiving a pair of first oscillating signals and outputting a frequency difference signal with a frequency equal to a difference between frequencies of the received pair of first oscillating signals.

5. The capacitance difference detecting circuit according to claim 4, wherein each of said PLL circuits has an input terminal that receives a set value for changing a frequency division ratio of a frequency divider in order for said mixer to receive the second oscillating signals with equal frequencies to each other in an initial state in which the external force is not applied, the frequency divider being built in each of said PLL circuits.

6. The capacitance difference detecting circuit according to claim 5, wherein said frequency divider has a fractional dividing function.

7. A capacitance difference detecting circuit comprising:

a pair of oscillators having capacitors whose capacitances chance according to an external force and generating first oscillating signals according to the capacitances, respectively;

a detecting unit detecting a relative difference between the capacitances as a difference between frequencies of the first oscillating signals;

a PLL circuit having a frequency divider disposed between one of said oscillators and said mixer, receiving one of the first oscillating signals from the one of said oscillators, generating a second oscillating signal with a frequency that is higher than a frequency of the one of said first oscillating signals, and outputting to said mixer the generated second oscillating signal as the one of said first oscillating signals; and a dividing control unit that changes a frequency division ratio of said frequency divider in order to make a frequency of the second oscillating signal coincide with a frequency of the other one of said first oscillating signals in an initial state in which the external force is not applied, wherein said detecting unit includes a mixer receiving a pair of first oscillating signals and outputting a frequency difference signal with a frequency equal to a difference between frequencies of the received pair of first oscillating signals.

8. The capacitance difference detecting circuit according to claim 7, further comprising:

a frequency comparator that compares in magnitude the other one of said first oscillating signals outputted from the other one of said oscillators with the frequency of the second oscillating signal, wherein said dividing control unit changes the frequency division ratio of said frequency divider according to a result of the comparison by said frequency comparator.

9. The capacitance difference detecting circuit according to claim 7, wherein:

said PLL circuit includes a frequency divider; and said frequency divider has a fractional dividing function.

10. A capacitance difference detecting circuit comprising:

a pair of oscillators having capacitors whose capacitances change according to an external force and generating first oscillating signals according to the capacitances, respectively;

a pair of PLL circuits having voltage controlled oscillators, and receiving the first oscillating signals from said oscillators to output second oscillating signals from the voltage controlled oscillators, respectively; and a detecting unit that receives input voltages to be inputted to the voltage controlled oscillators of said PLL circuits, respectively, the input voltages being adjusted according to frequencies of the first oscillating signals and the second oscillating signals, and that detects a difference between the received input voltages as a relative difference between the capacitances.

11. A MEMS sensor comprising:

a substrate;

a pair of first electrodes formed on said substrate;

a mass body displaceably disposed to face said substrate, oscillating in a direction perpendicular to said substrate, and displaced by an angular speed or acceleration applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a detecting unit that detects a relative difference between the capacitances as a change in frequencies of the first oscillating signals; and a main control unit that calculates the angular speed or acceleration applied in a horizontal direction of said substrate according to the chance in the frequencies detected by said detecting unit; and a mask control unit that activates a mask signal when the difference between the frequencies of the pair of first oscillating signals is smaller than a preset value, wherein said detecting unit includes a mixer receiving a pair of first oscillating signals and outputting a frequency difference signal with a frequency equal to a difference between frequencies of the received pair of first oscillating signals, and a frequency/voltage converting unit that converts the frequency of the frequency differences signal to a detection voltage indicating the relative difference between the capacitances and while receiving the activated mask signal, said frequency/voltage converting unit outputs the detection voltage indicating that the difference between the capacitances is zero.

12. A MEMS sensor comprising:

a substrate;

a pair of first electrodes formed on said substrate;

a mass body displaceably disposed to face said substrate, oscillating in a direction perpendicular to said substrate, and displaced by an angular speed or acceleration applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a detecting unit that detects a relative difference between the capacitances as a change in frequencies of the first oscillating signals;

a main control unit that calculates the angular speed or acceleration applied in a horizontal direction of said substrate according to the change in the frequencies detected by said detecting unit; and a frequency comparator comparing the frequencies of the first oscillating signals in magnitude, wherein said detecting unit includes a mixer receiving a pair of first oscillating signals and outputting a frequency difference signal with a frequency equal to a difference between frequencies of the received pair of first oscillating signals.

13. A MEMS sensor comprising:

a substrate;

a pair of first electrodes formed on said substrate;

a mass body displaceably disposed to face said substrate, oscillating in a direction perpendicular to said substrate, and displaced by an angular speed or acceleration applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a detecting unit that detects a relative difference between the capacitances as a change in frequencies of the first oscillating signals;

a main control unit that calculates the angular speed or acceleration applied in a horizontal direction of said substrate according to the change in the frequencies detected by said detecting unit; and a mask control unit that activates a mask signal when the difference between the frequencies of the pair of first oscillating signals is smaller than a preset value, wherein said detecting unit includes a mixer receiving a pair of first oscillating signals and outputting a frequency difference signal with a frequency equal to a difference between frequencies of the received pair of first oscillating signals, and while receiving the activated mask signal, said mixer outputs the frequency difference signal indicating that the difference between the frequencies of the first oscillating signals is zero.

14. A MEMS sensor comprising:

a substrate;

a pair of first electrodes formed on said substrate;

a mass body displaceably disposed to face said substrate, oscillating in a direction perpendicular to said substrate, and displaced by an angular speed or acceleration applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a detecting unit that detects a relative difference between the capacitances as a change in frequencies of the first oscillating signals;

a main control unit that calculates the angular speed or acceleration applied in a horizontal direction of said substrate according to the chance in the frequencies detected by said detecting unit; and a pair of PLL circuits disposed between said oscillators and said mixer, respectively, receiving the first oscillating signals from said oscillators to generate second oscillating signals having frequencies that are higher than the frequencies of the first oscillating signals, respectively, and outputting the generated second oscillating signals to said mixer as the first oscillating signals, wherein said detecting unit includes a mixer receiving a pair of first oscillating signals and outputting a frequency difference signal with a frequency equal to a difference between frequencies of the received pair of first oscillating signals.

15. The MEMS sensor according to claim 14, wherein each of said PLL circuits has an input terminal that receives a set value for changing a frequency division ratio of a frequency divider in order for said mixer to receive the second oscillating signals with equal frequencies to each other in an initial state in which the external force is not applied, the frequency divider being built in each of said PLL circuits.

16. The MEMS sensor according to claim 15, wherein said frequency divider has a fractional dividing function.

17. A MEMS sensor comprising:

a substrate;

a pair of first electrodes formed on said substrate;

a mass body displaceably disposed to face said substrate, oscillating in a direction perpendicular to said substrate, and displaced by an angular speed or acceleration applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a detecting unit that detects a relative difference between the capacitances as a chance in frequencies of the first oscillating signals; and a main control unit that calculates the angular speed or acceleration applied in a horizontal direction of said substrate according to the chance in the frequencies detected by said detecting unit; and a PLL circuit having a frequency divider disposed between one of said oscillators and said mixer, receiving one of the first oscillating signals from the one of said oscillators, generating a second oscillating signal with a frequency that is higher than a frequency of the one of said first oscillating signals, and outputting to said mixer the generated second oscillating signal as the one of said first oscillating signals; and a dividing control unit that changes a frequency division ratio of said frequency divider in order to make a frequency of the second oscillating signal coincide with a frequency of the other one of said first oscillating signals in an initial state in which the external force is not applied, wherein said detecting unit includes a mixer receiving a pair of first oscillating signals and outputting a frequency difference signal with a frequency equal to a difference between frequencies of the received pair of first oscillating signals.

18. The MEMS sensor according to claim 17, further comprising a frequency comparator that compares in magnitude the other one of said first oscillating signals outputted from the other one of said oscillators with the frequency of the second oscillating signal, wherein said dividing control unit changes the frequency division ratio of said frequency divider according to a result of the comparison by said frequency comparator.

19. The MEMS sensor according to claim 17, wherein:
said PLL circuit includes a frequency divider; and
said frequency divider has a fractional dividing function.

20. A MEMS sensor comprising:
a substrate;
a pair of first electrodes formed on said substrate;
a mass body displaceably disposed to face said substrate, oscillating in a direction perpendicular to said substrate, and displaced by an angular speed or accelera tion applied in a direction perpendicular to the direction of the oscillation;

second electrodes formed on said mass body at positions to face said first electrodes, respectively;

a pair of oscillators having a pair of capacitors each formed of the first electrode and the second electrode facing to each other, and generating the first oscillating signals according to capacitances of the capacitors, respectively;

a pair of PLL circuits having voltage controlled oscillators, and receiving the first oscillating signals from said oscillators to output second oscillating signals from the voltage controlled oscillators, respectively; and a detecting unit that receives input voltages to be inputted to the voltage controlled oscillators of said PLL circuits, respectively, the input voltages being adjusted according to frequencies of the first oscillating signals and the second oscillating signals, and that detects a difference between the received input voltages as a relative difference between the capacitances; and a main control unit that calculates the angular speed or acceleration applied in a horizontal direction of said substrate according to the change in the frequencies detected by said detecting unit.

* * * * *